(12) United States Patent
Neckermann et al.

(10) Patent No.: US 11,182,748 B1
(45) Date of Patent: Nov. 23, 2021

(54) AUGMENTED DATA INSIGHT GENERATION AND PROVISION

(71) Applicant: Microsoft Technology Licensing, LLC, Redmond, WA (US)

(72) Inventors: Tom Neckermann, Seattle, WA (US); Alexander James Wilson, Seattle, WA (US); Romain Gabriel Paul Rey, Vancouver (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/083,594

(22) Filed: Oct. 29, 2020

(51) Int. Cl.
| | | |
|---|---|---|
| *G06Q 10/10* | (2012.01) | |
| *G06F 16/901* | (2019.01) | |
| *G06N 20/00* | (2019.01) | |
| *G06N 5/02* | (2006.01) | |

(52) U.S. Cl.
CPC ....... *G06Q 10/109* (2013.01); *G06F 16/9024* (2019.01); *G06N 5/02* (2013.01); *G06N 20/00* (2019.01)

(58) Field of Classification Search
CPC ........ G06Q 10/109; G06N 20/00; G06N 5/02; G06F 16/9024; H04L 41/16; H04L 12/1813; H04L 12/1818; H04L 12/1822; H04L 29/08945; H04L 41/5093; H04L 65/403; H04L 67/32; H04N 1/32; H04N 7/15; H04N 21/4788
See application file for complete search history.

(56) References Cited

U.S. PATENT DOCUMENTS 11,038,974 B1* 6/2021 Koukoumidis ... G06F 16/24578
2020/0210647 A1* 7/2020 Panuganty ............ G06F 16/242

OTHER PUBLICATIONS

ConSent: Context-based sentiment analysis Katz, Gilad; Ofek, Nir; Shapira, Bracha. Knowledge-Based Systems 84: 162-78. Elsevier B.V. (Aug. 2015) (Year: 2015).*

* cited by examiner

*Primary Examiner* — Michael Won

(57) ABSTRACT

In the present disclosure, artificial intelligence (AI) processing is trained and leveraged to learn user-specific insights that are contextually relevant to a state of a user communication. Contextual information about a state of a user communication may be collected and analyzed. That contextual information may be cross-referenced with an extensive knowledge graph that is constructed from user context data. Exemplary AI processing may further be trained to apply a relevance analysis to assist with processing described herein including generation and curation of data insights that are most relevant to a state of a user communication. In some examples, the data insight generation process may be augmented by pre-generating data insights that may be relevant to a user communication prior to occurrence of the user communication. Further technical examples pertain to the rendering and presentation of representations of data insights through a graphical user interface (GUI).

20 Claims, 7 Drawing Sheets

100

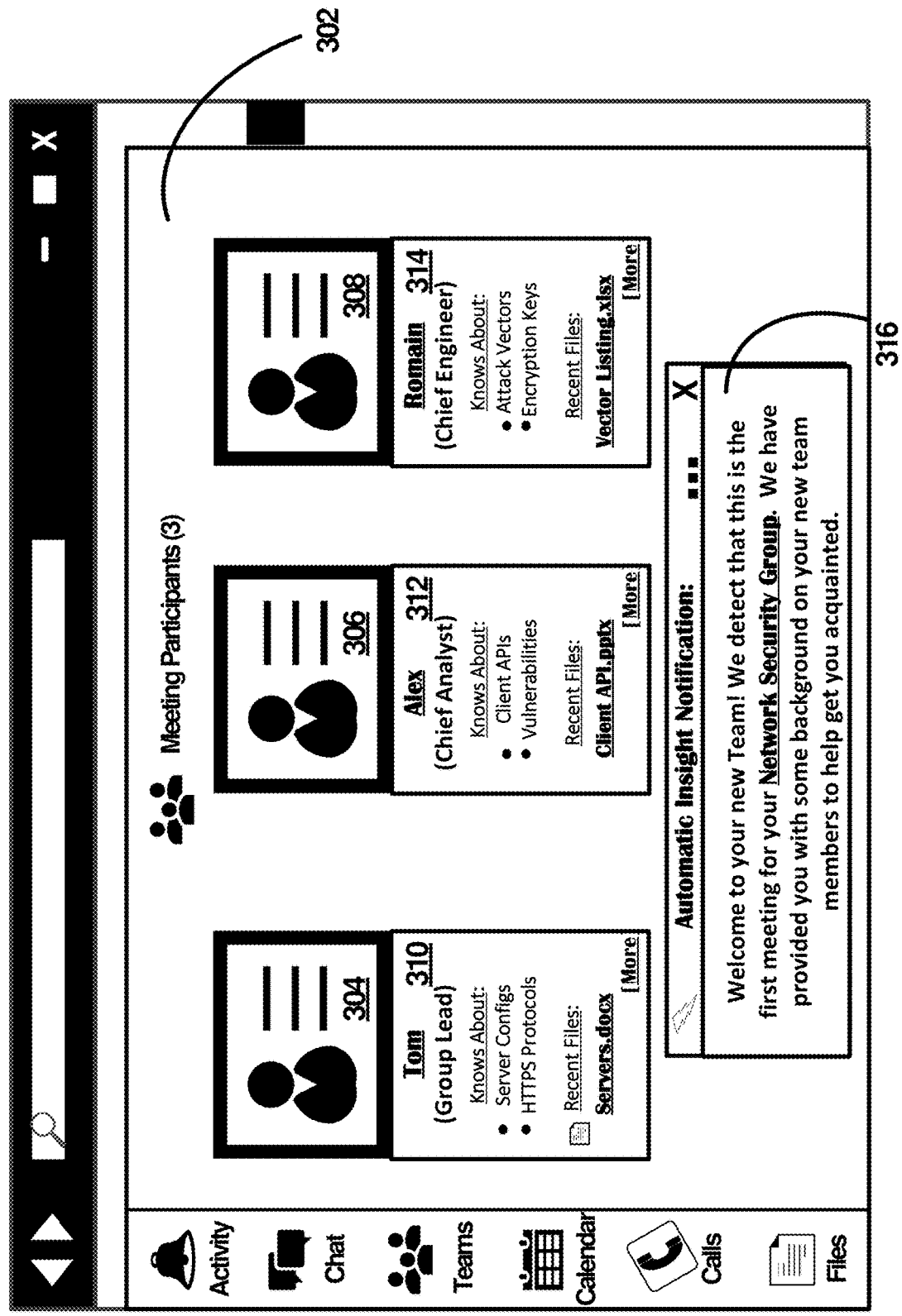

FIGURE 3B
320

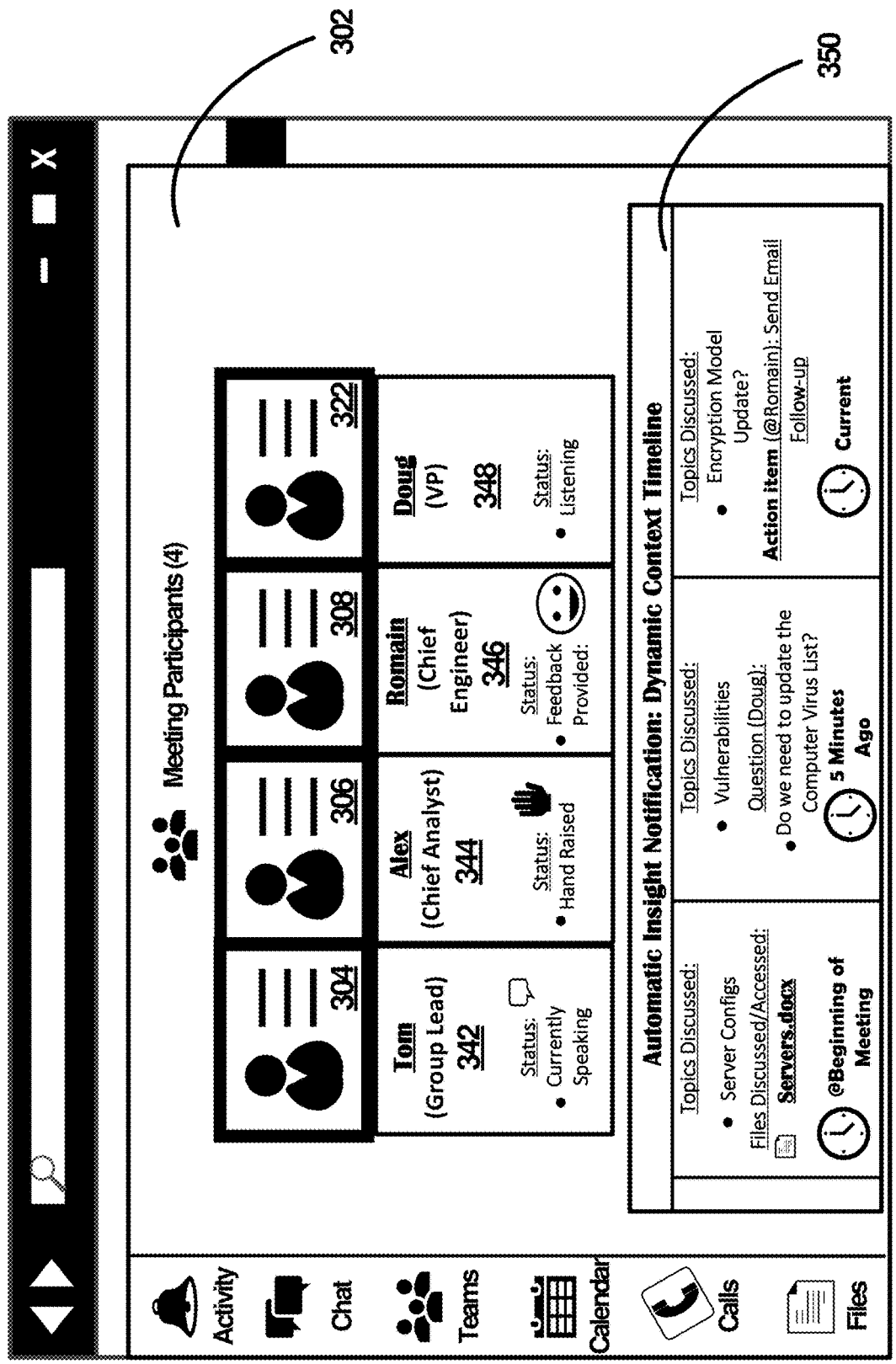

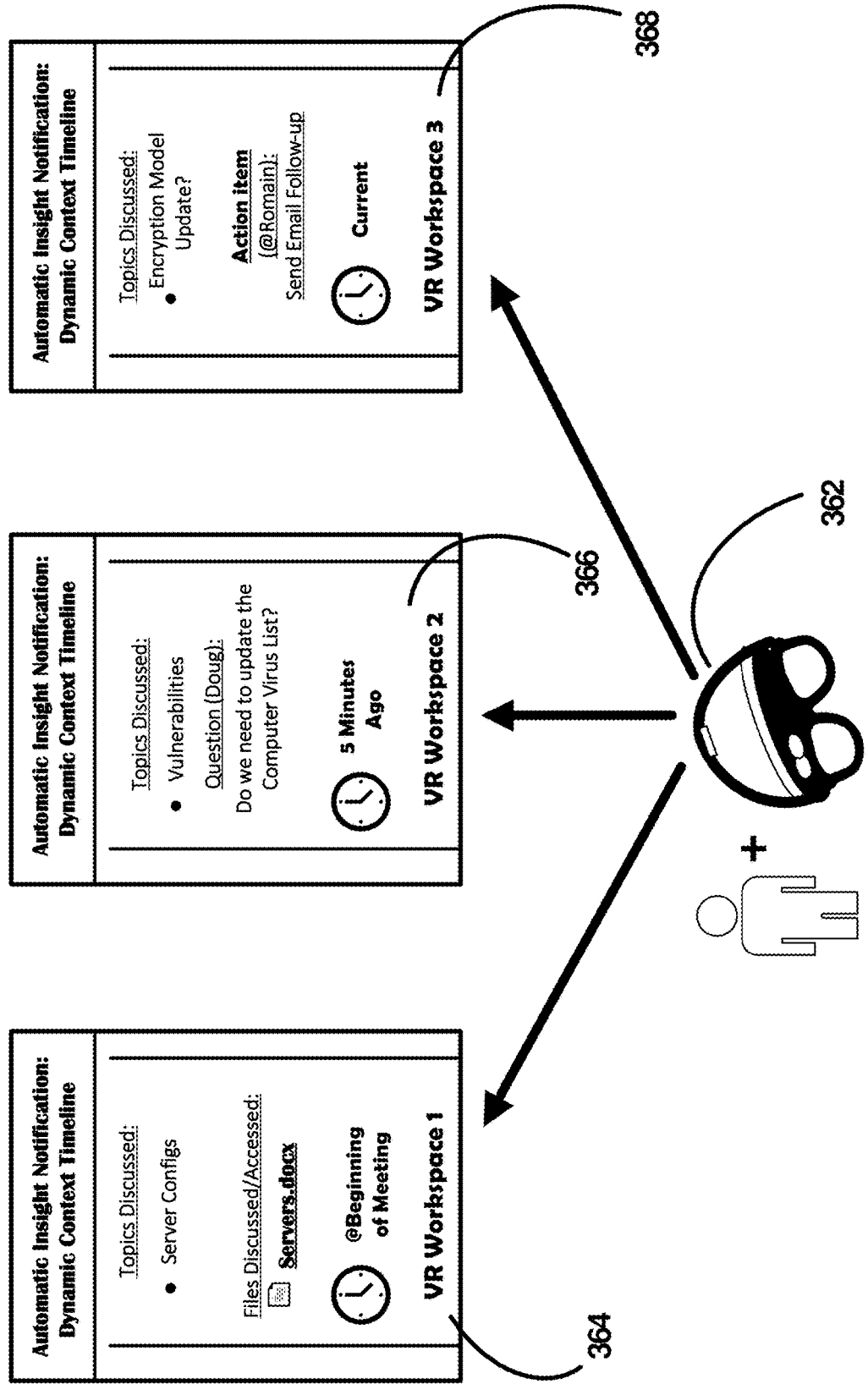

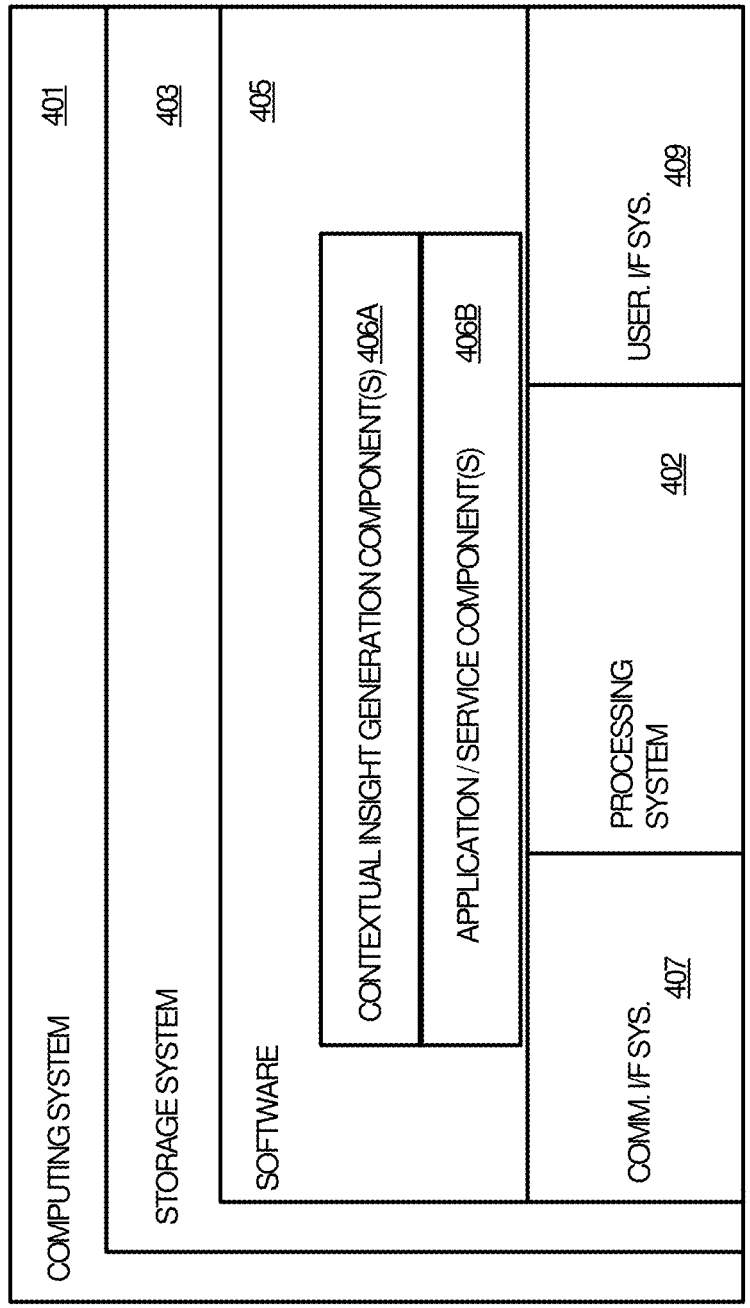

AUGMENTED DATA INSIGHT GENERATION AND PROVISION

BACKGROUND

With the recent surge in remote collaboration, collaborative communication applications/services have become essential tools to enable users to connect, for example, via remote meetings. Whether remote meetings are scheduled or conducted ad hoc, traditional application/service configurations typically require users to take manual action to identify relevant meeting content. For instance, users are required to locate relevant documents and attach those documents to a meeting. In other instances, users are required to make notes about follow-up actions and manually correspond with other users outside of the meeting to provide documentation discussed. This is inefficient from a processing standpoint and further negatively affects an overall user experience with a collaboration application/service as users have become technically savvy enough to understand that not every task should require manual action.

While some services may provide data insights as meeting enhancements, not all data insights are created equal. Despite access to thousands of documents, emails, and conversations, many data insights currently produced are low impact features that are not directed to the purpose of the remote meeting. An example of a low impact data insight may be blurring a user's background for privacy. Many produced insights may further be considered low impact by users because they do foster interaction between users and do so in a manner that also advances the meeting. Consider an example where a new team of users is conducting its introductory meeting but also has many business topics to discuss. The team of users may spend a good amount of time during that meeting introducing themselves and explaining their skill set and experience to each other because they are unfamiliar with one another. Traditional data insight generation does not factor this type of context into its determination as to how and when to surface data insights even though a meeting may be able to be advanced through provision of targeted contextual analysis.

Yet another technical problem arises when considering a timing of production of data insights. As identified above, traditional systems may access thousands of documents. This large amount of data may repeatedly be analyzed to generate new data insights each time a context change is detected. This can lead to reduced processing efficiency for computing devices as computing resources may be continuously tied up for insight generation processing especially in instances where data insights generation occurs independent of analysis of prior captured contexts. As dynamics of a remote meeting can change in an instant, it is imperative that processing efficiency be improved in the technical field of data insight generation.

Further technical challenges arise when considering recall of specific contexts that may exist during a meeting. In a single meeting, there may be a plurality of different contexts detected. Context recall traditionally targets a specific discussion point or document that was referenced in a meeting. However, traditional data insight systems are limited with respect to aggregation of a plurality of contexts in a meeting to provide users with the entire picture of what transpired.

SUMMARY

For resolution of the above technical problems and other reasons, there is a technical need for execution of more intelligent and timely contextual analysis that is usable to improve data insight generation and provision. In the present disclosure, artificial intelligence (AI) processing is trained and leveraged to learn user-specific insights that are contextually relevant to a state of a user communication. Contextual information about a state of a user communication may be collected and analyzed. That contextual information may be cross-referenced with an extensive knowledge graph that is constructed from user context data. Exemplary AI processing may further be trained to apply a relevance analysis to assist with processing described herein including generation and curation of data insights that are most relevant to a state of a user communication. In some examples, the data insight generation process may be augmented by pre-generating data insights that may be relevant to a user communication prior to occurrence of the user communication. Further technical examples pertain to the rendering and presentation of representations of data insights through a graphical user interface (GUI). In some examples, a representation of data insights may be an aggregated representation of generated data insights at different contextual reference points in a user communication.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 3A-3D illustrate exemplary device processing views associated with user interface examples for an improved user interface that is configured to enable provision of representations of data insights that are relevant to a contextual state of a user communication, with which aspects of the present disclosure may be practiced.

FIG. 4 illustrates a computing system suitable for implementing processing operations described herein related to generation and provision of data insights that are relevant to a contextual state of a user communication, with which aspects of the present disclosure may be practiced.

DETAILED DESCRIPTION

Figure 1:
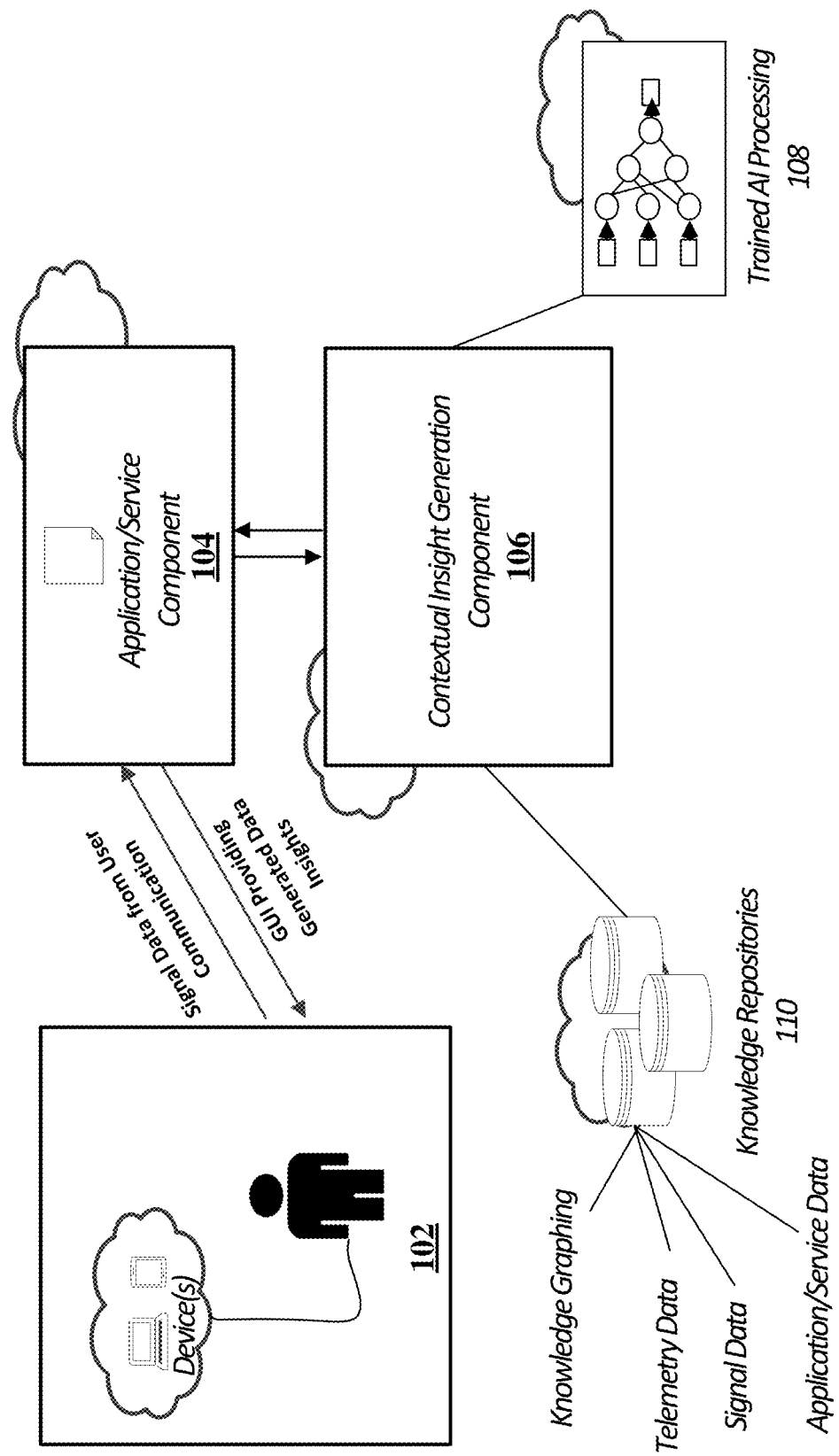
FIG. 1 illustrates an exemplary system diagram of components interfacing to enable automatic generation and provision of data insights and representations thereof, with which aspects of the present disclosure may be practiced.

As identified above, the present disclosure pertains to the application of AI processing that is trained and leveraged to learn user-specific insights which are contextually relevant to a state of a user communication. A user communication is a technical instance where at least one user is involved in a conversation. Such technical instances comprise collaborative communications between multiple users such as remote meetings (e.g., electronic meeting) or a conversation over an electronic medium (e.g., messaging, email, channel of a collaborative application/service) but may also extend to instances where a user is conducting a conversation with a software application/service (e.g., one that provides a chat-bot) that simulates dialogue of a conversation or other examples where only one user is providing dialogue. It is to be further to be recognized that a timing of applying data insight generation and provision processing of the present disclosure may comprise technical instances where: a user communication is scheduled to be conducted (e.g., evaluation of data from resources prior to the start of an electronic meeting); a user communication is in the process of being conducted; and even after one or more user communications has ended (e.g., as a summary of a previous communication).

In any example, user communications may be augmented by the inclusion of contextual relevant data insights that may be provided to users in real-time (or near real-time). Context information about a state of a user communication may be collected and analyzed to generate and curate contextually relevant data insights. That context information may be cross-referenced with an extensive knowledge graph that is constructed from user context data collected for different users. The user context data, that is mapped in the knowledge graph, can be explored to identify relevant data and relationships of users with respect to a specific state of a user communication. Non-limiting examples of user context data comprise but are not limited to: user-specific entity data, user preferences, past user actions and relationships between users including collaborative relationships in past interactions, topics of interest including topics identified in prior user communications, and electronic files including file access relationships to electronic files for one or more users, among other examples. The collected context information regarding a state of a specific user communication is then used to curate the knowledge graph and identify data that is usable to generate contextually relevant data insights.

Exemplary AI processing described herein may further be trained to apply a relevance analysis (e.g., relevance scoring) to assist with any of the processing operations described herein. One specific example is that where relevance analysis is applied to filter generated data insights so that contextually relevant data insights are provided to users at a most appropriate timing relative to the state of the user communication. A plurality of relevance models may be trained to evaluate the relevance of the user context data to the state of the user communication. In some examples, the specific attributes of the context information collected may be used to dictate which types of relevance models are to be applied. One or more data insights may be provided to a user through an application/service (e.g., one that is usable for conducting the user communication or even a separate application/service that may be concurrently executing).

In further examples, the data insight generation process may be augmented by pre-generating data insights that may be relevant to a user communication prior to occurrence of the user communication. This may enable processing, during occurrence of the user communication, to focus on identifying relevant data insights rather than having to generate new insights each time a contextual state change is detected. In technical instances where new insights are to be generated for state of a user communication, processing efficiency can be improved by reducing the processing load for insight generation and/or modifying previously generated data insights.

Moreover, the present disclosure is further directed to improving graphical user interfaces (GUIs) of applications/services, which may be used to present representations of generated data insights. A GUI is improved through the novel representations that are created to display generated data insights. Processing operations described in the present disclosure may customize a representation of data insights including a presentation layout of said representation based on analysis of the contextual state of a user communication. Customization of a presentation layout may comprise executing processing that determines the types of content to include in a representation as well as the amount of content to display for users. The collected context information may be further used to determine a timing for presentation of a representation of one or more generated data insights. Such a determination may factor in a level of urgency for providing a notification to users, among other contextually relevant determinations.

As user communications may be ongoing, the present disclosure further provides technical novelty in the creation of aggregated representations of generated data insights. Different data insights may be contextually relevant to different temporal designations of a user communication (or across multiple user communications). In cases where a user communication extends over a long period of time or is otherwise very technically complex (e.g., topic-wise), the present disclosure describes processing operations that enable generation and provision of a dynamic timeline of data insights. The dynamic timeline of data insights is configured to illustrate an aggregated chronological representation of data insights at different context states throughout a user communication (or multiple user communications). An aggregated representation of data insights based on a result of analysis of the context information collected for a state (or states) of the user communication(s). Furthermore, representations of generated data insights can be modified for viewing depending on the type of input device that a user may be working with. The present disclosure extends to working with any type of device including virtual reality (VR) and augmented reality (AR) devices. In technical instances where it is detected that a user is accessing content through a VR device or AR device, the processing of the present disclosure is configured to generate a representation of data insights that is tailored for the VR or AR device. For instance, a dynamic timeline of data insights may be adjustable to be represented across a plurality of virtual workspaces that are provided digitally by a VR device or AR device.

Exemplary technical advantages provided by processing described in the present disclosure comprise but are not limited to: building of a novel knowledge graph that maps \user context data which is searchable for identifying relationships relative to a state of a user communication; processing that specifically curates a stored knowledge graph based context information collected regarding a state of a user communication; automated processing that enables an ability to automatically generate higher quality and more contextually relevant data insights relative to one or more states of a user communication; new relevance ranking processing that can selectively apply relevance models in a manner that is usable for one or more of: curation of a stored knowledge graph, generation of data insights, curation of data insights, and generation of a representation of data insights; improved accuracy in predicting relevant data insights for a context state of a user communication; processing that enables generation of an aggregate representation of data insights across a plurality of contexts determined for one or more user communications; an ability to transform one or more computing devices into specific purposes computers configured for generation and provision of contextually relevant data insights; improved processing efficiency (e.g., reduction in processing cycles, saving resources/bandwidth) for computing devices when generating and providing contextually relevant data insights; adapting and improving a GUI of an application/service to integrate GUI elements for the provision and management of data insights; reduction in latency through efficiently programmed/trained AI processing; extensibility to customize representation of data insights for AR and VR device experiences; implementation of a novel contextual insight generation component that is further configured to interface with a plurality of applications/services (e.g., applications/services of a distributed software platform) to extend functionality during processing; and improving usability of applications/services for users via integration of processing described herein, among other technical advantages.

FIG. 1 illustrates an exemplary system diagram 100 of components interfacing to enable automatic generation and provision of data insights and representations thereof, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in method 200 (FIG. 2) as well as processing described in and associated with visual diagrams of FIGS. 3A-3D and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform (e.g., distributed software platform) that also provides, to a component, access to and knowledge of other components that are associated with applications/services. In one instance, processing operations described in system diagram 100 may be implemented by one or more components connected over a distributed network, where a user account may be working with a specific profile established through a distributed software platform. System diagram 100 comprises user computing devices 102; an application/service component 104; a contextual insight generation component 106; a component for implementation trained AI processing 108; and knowledge repositories 110.

System diagram 100 comprises user computing device(s) 102 (e.g., client computing device). An example of a user computing device 102 is a computing system (or computing systems) as described in the description of FIG. 4. A user may interact with an exemplary application/service, provided by an application/service component 104, through the user computing device(s) 102. For instance, the user may connect to an application/service through any number of different device modalities. Non-limiting examples of different types of modalities comprise but are not limited to: chat (including speech input); messaging (including SMS and instant messaging); email; collaborative communication channels; collaborative electronic documents; VR/AR workspaces, remote calls (e.g., VOIP); and remote meetings (e.g., electronic meetings), among other examples. In further examples, a user may carry on a multi-modal communication with an application/service via multiple user computing devices, where the present disclosure is intended to cover such technical instances.

In some examples, a user computing device 102 may connect to an application/service (e.g., a productivity application/service) that is utilized to enable management of a user communication. Management of a user communication is intended to cover any example where an application/service is used to: enable engagement of one or more users in a user communication; manage scheduling of a user communication (e.g., remote meeting, electronic meeting invites thereof) which may occur at a later point in time; and/or provide services that support a user communication (e.g., digital personal assistant application/service, notetaking application/service, recording application/service, application/service providing telemetry data analysis). In other examples, processing described herein is intended to occur asynchronous to a user connecting to an exemplary application/service. As referenced in the foregoing description, a user communication is a technical instance where at least one user is involved in a conversation, for example, through any of the above identified communication modalities. Such technical instances comprise collaborative communications between multiple users such as remote meetings (e.g., electronic meeting conducted through an application/service) or a conversation over an electronic medium (e.g., messaging, email, channel of a collaborative application/service). However, the present disclosure further extends to technical instances where a user is conducting a conversation with a software application/service (e.g., one that provides a chatbot) that simulates dialogue of a conversation or other examples where only one user is providing dialogue. Non-limiting examples of technical instances where a user is conducting a conversation with a software component comprise but are not limited to one or more users interfacing with a chat bot of a digital personal assistant application/service. A conversation is intended to cover any type of technical instance where there is an interactive communication involving one or more users. Examples of various types of conversations are known to one skilled in the field of art.

An exemplary application/service component 104 is configured to provide access to data associated with a state of a user communication and further provide renderings of GUIs of applications/services that are accessible by the user computing device 102. A state of a user communication is intended to refer to a timing (e.g., temporal designation) relative to an occurrence of user communication. The application/service component 104 interfaces with the contextual insight generation component 106, where the contextual insight generation component 106 may analyze data of one or more applications/services (e.g., provided via the application/service component 104) to generate a determination as to the state of the user communication. As described in the foregoing description, a state of a user communication may be refer to technical instances where a timing of a user communication is identified, such technical instances comprising but not limited to instances where: a user communication is scheduled to be conducted (e.g., evaluation of data from resources prior to the start of an electronic meeting); a user communication is in the process of being conducted; and even after one or more user communications has ended (e.g., as a summary of a previous communication).

Applications/services, provided through the application/service component 104, may be any type of programmed software. An exemplary application/service is a productivity application/service that is configured for execution of tasks including the management of data pertaining to user communications. Examples of productivity services comprise but are not limited to: word processing applications/services, spreadsheet applications/services, notes/notetaking applications/services, authoring applications/services, digital presentation applications/services, presentation broadcasting applications/services, search engine applications/services, email applications/services, messaging applications/services, web browsing applications/services, collaborative team applications/services, digital assistant applications/services, webpage building applications/service, directory applications/services, mapping services, calendaring services, electronic payment services, digital data storage or distributed data storage applications/services, web conferencing applications/services, call communication applications/services, language understanding applications/services, bot framework applications/services, networking applications/service, and social networking applications/services, among other examples. In some examples, an exemplary productivity application/service may be a component of a distributed software platform providing a suite of productivity applications/services. A distributed software platform is configured to providing access to a plurality of applications/services, thereby enabling cross-application/service usage to enhance functionality of a specific application/service at run-time. Distributed software platforms may further manage tenant configurations/user accounts to manage access to features, applications/services, etc. as well access to distributed data storage (including user-specific distributed data storage). Moreover, specific application/services (including those of a distributed software platform) may be configured to interface with other non-proprietary application/services (e.g., third-party applications/services) to extend functionality including data transformation and associated implementation.

Exemplary applications/services, provided by the application/service component 104, may interface with other components of system diagram 100 to enhance processing efficiency and functionality as described herein. For instance, the application/service component 104 is configured to interface with a user computing device 102 as well as the contextual insight generation component 106, component for implementation trained AI processing 108 and knowledge repositories 110 (e.g., of a distributed software platform). In doing so, signal data may be collected and analyzed one or more of: the application/service component 104; the contextual insight generation component 106, component for implementation trained AI processing 108 and, knowledge repositories 110, to enable contextual processing of data pertaining to a user communication including data relating to a contextual state of a user communication). Non-limiting examples of signal data that may be collected and analyzed comprises but is not limited to: device-specific signal data collected from operation of one or more user computing devices 102; user-specific signal data collected from specific tenants/user-accounts with respect to access to any of: devices, login to a distributed software platform, applications/services, etc.; and application-specific data collected from usage of applications/services. In further examples, analysis of signal data may comprise identifying correlations and relationships between the different types of signal data, where telemetric analysis may be applied to generate determinations with respect to a contextual state of a user communication. For instance, analysis of device-specific signal data, user-specific signal data and application-specific data can be collectively analyzed to provide a temporal representation of a user with respect to a state of user communication. As one non-limiting example, a user may be preparing for a meeting prior to occurrence of the meeting, where specific electronic documents and/or applications/services are being accessed concurrently while the user is preparing. Analysis of such types of signal data in an aggregate manner may be useful in helping generate contextually relevant data insights for a meeting and/or specific users even prior to the start of the meeting. Further, as the context of the meeting changes (e.g., the meeting starts and new participants join), the prior telemetric analysis of the signal data may aid the curation process for identifying relevant data insights to surface at a specific point in the meeting, where the data insights may be more relevant if they are tied back to at least one state of user (e.g., prior user context and/or current user context).

The application/service component 104 is further configured to present, through interfacing with the contextual insight generation component 106, an adapted GUI that provides user notifications, GUI menus, GUI elements, etc., to manage a state of display of representations of generated data insights. For instance, a GUI of an application/service may be configured to provide a user interface element that presents a representation of a subset of data insights that is relevant to a detected state of a user communication. In many examples, an improved GUI may be configured to enable users to interact directly with a representation of a data insight through selection of GUI elements and features. In other instances, an application command control (e.g., user interface ribbon) may be adapted to include selectable user interface features to manage states of representations of data insights. For instance, an initial representation of a data insight may be in a condensed format that can be expanded to provide additional information about a specific data insight, links to additional content (including rich interactive data objects) and the like. As subsequently described, a presentation format and layout of a representation of a data insight (e.g., representation of a subset of one or more data insights) as well as a timing for presentation of the same may be determined based on analysis of collected context information related to a state of a user communication. Non-limiting visual examples of an improved GUI, and GUI elements provided therein, are provided in FIGS. 3A-3D.

The contextual insight generation component 106 is one or more components configured to execute and manage processing operations related to generation and provision of data insights including generation of representations of data insights (e.g., a subset of one or more data insights) that are contextually relevant to one or more determined states of a user communication. In some examples, the contextual insight generation component 106 may be a distributed computing device (e.g., distributed server device) that executes processing asynchronously from the user computing device 102 which is usable to access a GUI of an application/service. In other examples, the contextual insight generation component 106 may be configured as a component that executes on the user computing device 102. In alternative examples, the contextual insight generation component 106 is a system of components that execute across one or more server devices and one or more components executing on the user computing device 102, where a network connection is usable to connect the components in a system configuration.

The contextual insight generation component 106 may be configured to execute any processing operations described herein, including those described relative to method 200 (FIG. 2), and processing associated with visual diagrams of FIGS. 3A-3D and further described in the accompanying description. Non-limiting examples of types of processing operations executed by the contextual insight generation component 106 comprise but are not limited to: generation/building of a knowledge graph that is customized to identify user context data for a plurality of users; management of access to the knowledge graph including curation of the knowledge graph; update of the knowledge graph; collection of context information about a state (e.g., current state) of a user communication including analysis of data associated with a user communication; generation of data insights that are relevant to a state of a user communication; execution of relevance scoring for any processing operations executed by the contextual insight generation component 106 including selection of applicable relevance ranking models, generation of data insights, selection of relevant data insights for a state of a user communication, etc.; generation of a representation of data insights (e.g., subsets of one or more data insights) that are contextually relevant to a state (or states) of a user communication including generation of aggregate representations of data insights for one or more user communications (e.g., dynamic timeline of data insights); determining of a presentation layout for a representation of data insights; determining summary information to include in a representation of data insights; determining a level of urgency of notification of a data insight relative to a state of a user communication; transmission of data for rendering of a representation of data insights in a GUI of an application/service; rendering of a representation of data insights; and management of interactions with data insights (representations of data insights) including update of representations of data insights, among other examples. It is further to be recognized that an order of execution of processing operations by the contextual insight generation component 106 may vary without departing from the spirit of the present disclosure.

As referenced in the foregoing description, the contextual insight generation component 106 may be configured to execute processing operations related to generation and management of a knowledge graph. An exemplary knowledge graph is a customized version of a network graph. A network graph is used to identify interconnections between a set of entities, where each entity is represented by a node (or vertex) and connections between nodes are represented through links (or edges). Processing operations for generation and management of a network graph and attributes thereof are known to one skilled in the field of art.

Above what is traditionally known, an exemplary knowledge graph is customized to model relationship between users and their environments through a mapping of user context data. Non-limiting examples of user context data comprise but are not limited to: user-specific entity data, user preferences, past user actions and relationships between users including collaborative relationships in past interactions, topics of interest including topics identified in prior user communications of users, and electronic files including file access relationships to electronic files for one or more users, among other examples. With respect to entity-specific user data, types thereof may comprise but are not limited to: user identity data (e.g., user account information, personal information, business/organizational information, social networking data including experience, expertise, connections to other users, etc.); computing devices associated with a user or group of users; and applications/services associated with a user or group of users. Other aspects of user context data such as electronic files, topics, etc., may be correlated to establish relationships therefrom with one or more users that are mapped in the knowledge graph. To help curate the knowledge graph, context information, collected from data associated with a user communication, can be utilized to identify users that are relevant to a current state of a user communication. Nodes and connections for each aspect of user context data are built out so that specific information about a user can be recalled and relationships between the different aspects of user context data can be identified when context information for a state of a user communication is used to filter the data of the knowledge graph.

In one non-limiting implementation, the knowledge graph comprises a mapping where each node is an "entity" that belongs to an organization. As such, the contextual insight generation component 106 is configured to identify and map entities within the organization and relationships therebetween. In this way, the knowledge graph is configured to place data thereof in context via linking and semantic metadata, ultimately providing a framework for data integration, analytics, unification and sharing. Among other examples, an entity may be a user, a group/team of users, an electronic file, an email, a message, a previous meeting (e.g., a reoccurring meeting), a conversation involving one or more users and an instance of collaborative access among the other types of entities identified. Specific entities may be detected (e.g., pertaining to a user) and interactions between those entities may be labeled for later recall including building out the knowledge graph. Detecting specific entities within a knowledge graph may further help identify direct and/or indirect relationships to other entities, which is further useful for building the knowledge graph. For example, if two users (John and Mary) both previously edited the same electronic document, the knowledge graph may be configured to map an indirect relationship between them, even if the users never interacted directly with each other. Indeed, it is possible that all entities in the graph are connected (directly or indirectly). In examples where entities correspond to specific users, direct relationships may pertain to instances where two or more users concurrently interacted with a specific type entity (e.g., electronic file, topic) through access or engagement in a user communication. Indirect relationships may pertain to those technical instances where individual users may have independently (but not concurrently) interacted with a specific type entity from access by other users. An exemplary knowledge graph can be leveraged as a data source for data insight generation of any kind and not exclusively limited to those contextually relevant to a user communication. In some technical instances, a single knowledge graph may be usable to evaluate different contextual scenarios and in other technical instances different versions of a knowledge graph may be built and stored to aid processing efficiency in data insight generation. In technical instances where different versions of a knowledge graph are built, a weighting may be applied, at the time of building the knowledge graph, to specific entities that are contextually relevant to the contextual scenario for which the knowledge graph is being built.

To complete building of an exemplary knowledge graph, the contextual insight generation component 106 is configured to label content-based entities (e.g. files and emails) with topics (e.g. "security risks to cloud-based data storage"). These topics are useful so that relevant insights can be extracted from the knowledge graph for a user communication (e.g., before, during or after a user communication such as an electronic meeting). For example, if the two users previously discussed (John and Mary) are in a call discussing "network sync issues", it would not be useful to generate insights about "Egyptian pyramids". As previously referenced, one or more relevance models may be trained and applied to help determine the relevance of data insights. However, it is useful to use entity data such as topics to help curate the big data of the knowledge graph to a manageable size that focuses on contextually relevant data. This further emphasizes how processing of the present disclosure improved processing efficiency of computing devices with respect to curation of large data resources such as a knowledge graph. Labeling of entity data may comprise providing searchable labels and information that can aid the curation of the user context data when queried for contextually relevant analysis. Among other non-limiting examples of labels, the following types of labels can be generated: classification label (e.g., identification of classes, roles, hierarchy of an organization); relationship types (e.g., formal relationship identifications, dependencies such as parent/child, sub-region definition, transitive relationships); categorization (e.g., associations of entity to specific categories, entities, links, hashtags, search terms); and free text description comprising any type of information that can be pertinent to contextual evaluation of entities, among other examples.

The contextual insight generation component 106 is usable to manage and oversee building of an exemplary knowledge graph. In some examples, the contextual insight generation component 106 is configured to interface with the component for implementation of trained AI processing 108 to apply trained AI processing which may be used to build out the knowledge graph. In one technical instance, the component for implementation of trained AI processing 108 applies a trained model (or multiple trained models) configured for the specific purposes of building a knowledge graph and managing update of the knowledge graph. Non-limiting examples of specific types of trained modeling that may be applied to build and manage the knowledge graph are subsequently described in the description of the component for implementation of trained AI processing 108, some examples of which comprise: machine learning modeling, neural network models and transformers, among other types of trained AI processing subsequent described.

Specific processing operations executed by the trained modeling for generation (and update) of a knowledge graph comprise collection of a corpus of data from a variety of data sources (e.g., entity databases, telemetry data, log data, other network graphs). As the present disclosure includes networking capabilities of a distributed software platform can cross-leverage a corpus of data from various applications/services (accessible over a network connection) to aid building and maintenance of a knowledge graph. In some examples, relevance ranking/scoring may be applied to evaluate entities for inclusion in a knowledge graph. Examples of applicable relevance scoring is subsequently described in the present disclosure. Non-limiting examples of a corpus of data including entity-specific data identifying types of entities for mapping; signal data collected regarding users, devices and applications/services (including specific topics, electronic files and access thereto); log data from usage of applications/services; user feedback data from interactions with content (including representations of data insights) and/or applications/services; and telemetry data (e.g., collected for specific users) regarding relations with entities derived from analysis of collected signal data and/or log data, among other examples. The corpus of data used to build (and update) a knowledge graph may be maintained on distributed storage by knowledge repositories 110 and accessible through interfacing with the other components described in system diagram 100 including the contextual insight generation component 106 and the component for implementation trained AI processing 108. As an example, a knowledge repository 110 storing the knowledge graph may be a database that is accessible by components of a software data platform. Queries may be directed to the database to access and curate data of the stored knowledge graph. In some examples, the database may be a distributed storage database or multiple distributed databases stored on one or more computing devices.

Furthermore, other examples of processing operations executed by trained modeling for building and maintaining a knowledge graph comprise but are not limited to: selection of specific types of entities as nodes for the knowledge graph; identifying relationships between entities (e.g., direct, indirect and/or weighted identification of specific types of relationships); labeling of identified entities and relationships; application of a relevance ranking for selection of entities and/or identification of relationships between entities; exposing the knowledge graph for access including contextual evaluation of a state of a user communication; and updating a state of the knowledge graph, among other examples. An important property of the knowledge graph is that it must be kept up to date. The easiest approach is to continuously create, modify and remove entities as users/files/emails/etc. are created, modified, and removed. Similarly, new interactions would result in new relationships, and updates to content-based entities would result in changes to entity labels (e.g., topic labels) to keep the knowledge graph up to date as well as infer new facts for data insight generation. An exemplary knowledge graph (or versions thereof) may be stored via the knowledge repositories 110 for subsequent access and exposure. For example, the knowledge graph may be stored on a distributed data storage so that it can be accessed by the contextual insight generation component 106, over a network connection, for management of data thereof and further by the component for implementation trained AI processing 108 so that the stored knowledge graph can be curated and data insights generated therefrom.

Moreover, the contextual insight generation component 106 is further configured to evaluate a state of a user communication. Context information about a state of a user communication may be collected and analyzed, relative to user context data of the knowledge graph to identify relevant user context data. A result of that correlation is subsequently used to generate relevant data insights representative of a current state of a user communication. Similar to other processing operations executed by the contextual insight generation component 106, the contextual insight generation component 106 may be configured to utilize the component for implementation of trained AI processing 108 to execute processing operations for collection and analysis of exemplary context information regarding a state of a user communication. The component for implementation of trained AI processing 108 applies a trained model (or multiple trained models) configured for the specific purposes of analyzing signal data (e.g., user-specific, device-specific, application-specific) and data associated with a user communication for relevance to specific types (attributes) of context information. With respect to the collection of context information regarding a state of a user communication, the contextual insight generation component 106, the component for implementation of trained AI processing 108 or a combination thereof may be configured to execute processing operations that analyze data associated with the user communication. Data associated with user communication may be any data or information that is used for management of a user communication. Management of a user communication is intended to cover any example where an application/service is applied to: manage scheduling of a user communication (e.g., remote meeting, electronic meeting invites thereof) which may occur at a later point in time; enable engagement of one or more users in a user communication; analyze signal data associated with users/computing devices/applications/services; and/or provision of services that support a user communication (e.g., digital personal assistant application/service, notetaking application/service, recording application/service, application/service providing telemetry data analysis). As a contextual state of a user communication may dynamically change over time, data associated with a user communication can be analyzed at any point including prior to the occurrence of a user communication and even after the conclusion of a user communication. It is to be further understood that collection and analysis of context information regarding a state of a user communication further extends to instances where an aggregate analysis is derived from analysis of multiple user communications. As referenced in the foregoing description, prior contextual analysis can be leveraged to aid contextual evaluation of subsequent user communications, thereby improving processing efficiency and accuracy/precision in identifying relevant data insights.

The contextual insight generation component 106 may be configured to target specific types of context information to identify a state (current state) of a user communication. For instance, context information identifying a state of a user communication may comprise but is not limited to: a temporal designation indicating a point in time relative to an occurrence of a user communication; user-specific identification for users associated with a state of the user communication; one or more topics associated with a state of the user communication; signal data including user-specific signal data identified at the temporal designation or another point in time relative to the temporal designation; and electronic files associated with the user communication including electronic files attached to data associated with the user communication.

In some examples, relevance ranking/scoring may be applied to aid collection of context information. Examples of relevance ranking/scoring applicable are subsequently described in the present disclosure. In some examples, specific context information such as the temporal designation is used to not only identify a specific point in time relative to the occurrence of a user communication but also usable to determine next processing steps for evaluating the context information. For instance, an identified temporal designation may be used to aid subsequent processing operations including but not limited to: assigning a weighting for specific types of the context information to curate the user context data of the knowledge graph; selecting applicable relevance models for relevance evaluation of context information and user context data; generating relevant data insights; generating representations of data insights; and selecting a timing for presentation of a representation of data insights in a GUI, among other examples.

With respect to the specific attributes of context information, data pertaining to user-specific identification may comprise any user identity data used to identify a specific user or group of users. For instance, user-specific identification may comprise: a name of a user; user account information for the user; aliases or nicknames for the user; and contact information for the user (e.g., email address, phone number), among other examples. This data is useful to identify and utilize to aid querying of the stored knowledge graph. In one instance where a user communication is a remote meeting (e.g., electronic meeting conducted remotely), data associated with the remote meeting may be an electronic meeting invite providing meeting details enabling users to connect to the remote meeting. In such an example, user-specific identification for a user may be provided in an invitee portion (e.g., attendee fields such as 'required' field or 'option' field) or a participant portion (e.g., participant response status) of the electronic meeting invite.

In some cases, user-specific identification may comprise predictive analysis to predict users who may join a user communication such as an electronic meeting. For instance, a user communication can be analyzed to whether the user communication is reoccurring (e.g., weekly electronic meeting among team members of an organization). This may be determined from analysis of signal data of previous meeting invites or occurrence of previous meetings, which enables user-specific identification of users who may potentially join a meeting even if those users may not have been included on an electronic invite for the meeting. For instance, say a user in a manager role occasionally joins a reoccurring meeting. It would be extremely helpful to generate data insights that are relevant the manager joining that meeting prior to the occurrence of the meeting while users may be offline so that data insights can be selected for presentation rather than generated when the users are involved in a meeting. That is, this predict analysis helps streamline the generation of data insights for different contextual scenarios so that contextually relevant data insights can be generated prior to a context change and then recalled without the need to run through the entire process of generating data insights each time a new user joins a meeting.

Yet another attribute of context information that may be collected and analyzed may be topics of relevance. Topics identified at (or proximate to) the temporal designation may be useful to further help curate the stored knowledge graph. In the example where the user communication is a remote electronic meeting, data associated with the remote electronic meeting invite may be analyzed to identify attributes including but not limited to: the title of the electronic meeting invite; data entered in the subject line; and notes provided by users within the electronic meeting invite. Topics may further be identified from other modalities of user communications that are proximate to the detection of the temporal designation. For instance, users may utilize a message service to discuss preparation for a meeting where topics of significance to the meeting may be identified. Topical detection may routinely occur while a user communication is in progress and being conducted, where topics can change as meeting discussion progresses.

Once participants start speaking, audio from the users may be transcribed to text and analyzed to extract more granular topics in real-time (or near real-time). In examples where the users are engaged in an active electronic meeting, data associated with user communication may be any type of meeting data provided through an application/service that is used to host the electronic meeting as well as any type of signal data previously discussed in the present disclosure. This may comprise signal data analysis including user actions taken during occurrence of a meeting whether they result in an explicit message being set to another user or not. Commonly collaboration-focused applications/services enable users to communication through a variety of modalities or in a multi-modal fashion, especially when conducting a meeting. In such instances, signal data may be monitored across each of those modalities including but not limited to: user speech; text and messaging input; comments, user feedback; and even user actions that implicitly indicate an intent but do not directly result in a communication being sent to other users.

Furthermore, another attribute of context information that may be collected and analyzed may be usage of electronic files. Usage of electronic files may comprise instances where electronic files are attached to a user communication or data thereof (e.g., an invite for a user communication). When electronic files are attached to a user communication, there is a high likelihood that such files will be accessed and discussed during the user communication. Other examples of usage of electronic files pertain to analysis of access to electronic files by users both individually and collaboratively. This type of analysis may be the result of analysis of signal data as previously discussed in the present disclosure. For example, if it is found that participants of an electronic meeting each recently opened or edited an electronic file, "Incident Root Cause Analysis.docx", and further each contributed to a recent email thread titled "Severity 1 incident", then it is likely that a scheduled electronic meeting is for a team's site reliability engineers to discuss their most recent service outage. By detecting relationships in access to electronic files and related topics, relevant data from the stored knowledge graph can be readily identified and used for data insight generation. Continuing the above example where use access to electronic files and email threads was detected, statistical data like "number of users affected," can be extracted from the "Incident Root Cause Analysis.docx" electronic file and used for data insight generation.

The contextual insight generation component 106 is further configured to curate the storage knowledge graph using the context information collected. With respect to curation of a stored knowledge graph, the contextual insight generation component 106, the component for implementation of trained AI processing 108 or a combination thereof, may be configured to execute relating to curation of the knowledge graph using the context data collected for the state of the user communication. In examples where AI processing is implemented to improve the curation process, the component for implementation of trained AI processing 108 applies a trained model (or multiple trained models) configured for the specific purposes of utilizing the context information collected to identify relevant user context data for data insight generation. In other examples, curation of the knowledge graph may occur through a programmed software module or API that is configured to enable developer access to the knowledge graph.

In any example, the context information collected may be converted into queries using the context information, where the queries are usable to search the user context data of the storage knowledge graph for relevant data and relationships therebetween. Non-limiting of examples of types of relevant user context data and relationships that may be identified for the context information comprise but are not limited to: user-specific entity data for users associated with a user communication; collaborative relationships previously existing between users; file access relationships indicating electronic files access by users (individually and/or collaboratively); and relevant topics including topics identified from prior communications of the users, among other examples. In some examples, modeling of a trained AI processing is configured to utilize the various aspects of context information as input features and assign a weighting to specific types of the context information to aid curation of the user context data of the knowledge graph. The aim is to identify an assortment of relationships in the user context that can be used to generate a variety of data insights, where data insights reflect quantitative relationships as well as qualitative relationships. As a state of a user communication is dynamic, it is important to utilize the temporal designation, of the collected context information, to identify relationships that are most relevant to the state of the user communication. In examples where a weighting is applied, relationships identified in the user context data may be reflective of an emphasis placed on certain attributes of the collected context information. For instance, the weighting may affect the number of insights generated for each type of relationship identified. This may greatly assist later recall of generated data insights, where certain information may be more relevant to the user communication at a later point in time (and data insights may have already been generated before that point).

Curation processing may comprise evaluating distance measurements between connecting entities within the stored knowledge graph. A distance measurement associated with a connection between entities may factor in one or more of a number of: nodes, vertices, links, edges, or a combination thereof. Developers may set a threshold relative to the distance evaluation to filter the user context data as an initial relevance assessment relative to the context information and thresholds may vary as desired by developers without departing from the spirit of the present disclosure. As an example, a threshold distance evaluation may be configured to evaluate a distance between nodes in the stored knowledge graph after curating the stored knowledge graph using the context information. However, as identified above, a distance evaluation may factor in any analysis of any type of connection within the knowledge graph (e.g., a threshold may be set for the number of nodes in between connections and also evaluate the number of edges therebetween as well). In one example, a threshold for distance evaluation of a connection between entities of the user context data may be set at two or less nodes. In some technical instances, the types of context information collected may be utilized to define a threshold for the distance evaluation. For instance, if certain attributes of the context information are more relevant (or some being nonexistent), then it may make sense to adjust the threshold to identify additional relevant data for insight generation.

Moreover, the curation processing may further comprise execution of a relevance scoring (e.g., relevance scoring function) to evaluate whether information is relevant enough to generate insights therefrom. Relevance scoring as described herein may be applicable to aid any of the decisions/determinations made by the contextual insight generation component 106 and/or the component for implementation of trained AI processing 108. This may comprise processing for building the knowledge graph; processing for curating the knowledge graph; processing for generating data insights; and processing for selecting data insights for presentation (e.g., relative to a current state of a user communication.

Throughout a user communication, the contextual insight generation component 106 is configured to continuously finds information related to a detected context and a current conversational topic. There might be hundreds of potentially relevant insights at any one time, but only the most relevant data should be surfaced for a user. An exemplary relevance scoring function may compute, for each insight, how relevant it is based on the current context (including current topic) of a user communication. A relevance scoring function may be an aggregation of results of one or more trained relevance models, which are subsequently described. In one example, a relevance scoring function is derived by computing an aggregate score related to: a count of number of connections between an insight's source (e.g. file it is extracted from) from a distance evaluation after curation of the knowledge graph; and computing scoring relative to entities and topics identified in the context information of the user communication. However, it is to be understood that a relevance scoring function may consider any of the relevance aspects described herein in any combination (and computed in any order).

In execution, the relevance scoring, executed by the component for implementation of trained AI processing 108, applies one or more trained relevance models configured to score a relevance of a data insight to the context information collected about a current state of the user communication. As indicated in the foregoing description, relevance models may be selectively applied in some technical instances, where attributes of the collected context information may be utilized to identify which relevance models are most appropriate to evaluate a relevance of user context data identified. In one example, multiple rounds of relevance scoring may be executed, where a plurality of different trained relevance models may be applied to evaluate different aspects of relevance between the user context and the collected context information associated with a state of a user communication. In some technical instances where multiple trained relevance models are applied, an overall relevance score may be determined that is an aggregation of relevance scores generated by each trained relevance model. In other technical instances where multiple trained relevance models are applied, a threshold scoring evaluation may be utilized to help filter out connections identified in the user context data before subsequent relevance evaluation is conducted by additional trained relevance models. For instance, a first trained relevance model may be applied and if a threshold relevance score is not reached then additional relevance evaluation is not necessary. Developers may set thresholds at their discretion without departing from the spirit of the present disclosure.

As indicated above, selective application of relevance scoring modeling may provide the most efficient and contextually relevant analysis of data relative to a state of a user communication. For instance, the temporal designation, identified in the context information collected about the state of the user communication, may be used to select one or more trained relevance models from a plurality of trained relevance models usable for executing the relevance scoring. This processing is extremely beneficial to streamline processing as some specific types of contextual relevance (e.g., that which analyzes relationships between files attached to an electronic meeting) would not be as relevant in instances where no files were attached to an electronic meeting/electronic meeting invite, but other instances of collaborative access may provide great intel as to what types of data may be most relevant to a group of users. It is to be understood that any type of context information described herein may be utilized to aid selection of applicability of trained relevance models, an order in which the trained relevance models are applied, threshold scoring and/or how specific user context data is selected for data insight generation.

Non-limiting examples of relevance modeling that may be trained and exposed for application are now described. A first trained relevance model may be configured to generate a first scoring metric for evaluating relevance of user context data to collected context information based on the threshold distance evaluation previously described. For example, the first scoring metric is generated based on an evaluation of the distance (e.g., count) between nodes (and/or other types of connections) in the stored knowledge graph identified in the threshold distance evaluation. By determining a scoring metric associated with the distance evaluation, different connections can be comparatively evaluated and/or categorized. In some technical examples, a specific number of data insights may be generated, where a threshold for scoring (e.g., using the first scoring metric) can be used to identify how many data insights to generate (e.g., a first tier that has a highest scoring metric, and selected number of data insights from lower tiers). The first scoring metric is useful to aid selection of user context data for generation of data insights as well as whether to include generated data insights in representation of data insights providable to a user. The first scoring metric is further useful to evaluate a timing as to when to notify a user of a generated data insight (e.g., what is the level of urgency for notifying a user relative to the current state of the communication). In some technical instances, relevance scoring of a generated data insight may be recalculated when a context change is detected (e.g., change to the current state of the user communication), which can make previously generated data insights relevant for presentation.

A second trained relevance model may be configured to generate a second scoring metric for evaluating relevance of user context data to collected context information based on an analysis of access to content including an amount of prior collaboration between the two or more users. Collaboration between users may be a key indicator of relevance to specific content. For example, if most of the users interacted with content A and content B, then A and B have a higher chance to be similar as compared to other types of relevance analysis. As such, the second scoring metric is content-based scoring evaluated through a lens of user access to content. For text or presentations content, this could be achieved through topic extraction: if two electronic documents are on the same topic, they have higher chance to be similar. Access to content related to that topic may be relevant. Moreover, the second scoring metric may be configured to comparatively analysis types of access to content including whether there was direct collaboration between users; indirect collaboration between users; individual access by users or even no collaboration (or access) by users. In total, an aggregate score may be determined relative to the access to content with an emphasis on the amount (and type) of collaboration. As user-signal data may be detected during the occurrence of a user communication, user interactions provided during the user communication may also be considered relevant and scored highly for data insight generation.

A third trained relevance model may be configured to generate a third scoring metric for evaluating connections between user context data for relevance based on an analysis of a relevance to the one or more topics, identified from the context information at the temporal designation, for a current state of a user communication. As an example, an entity detection model may be applied to score mentions relative to content. If certain people, teams, or organizations are mentioned in two electronic documents, then they are linked automatically. Indeed, meetings are usually about specific topics concerning specific entities, so it's useful to tracks relationships in this content-based manner. As an example, the third scoring metric may be a scoring generated from a count of a number of topical mentions across content (e.g., electronic files, messages, emails, conversations, etc.).

A fourth trained relevance model may be configured to generate a fourth scoring metric for evaluating connections between user context data for relevance based on an analysis of the temporal designation identified for a current state of a user communication. As indicated in the foregoing description, the temporal designation may be an indication as to how relevant something is to a user at a specific point in time. For instance, the fourth scoring metric may generate a scoring based that reflects what point in a lifecycle of a user communication the current state is at. Non-limiting examples of points in a lifecycle of a user communication comprise but are not limited to: a preparation phase occurring prior to the occurrence of the user communication; any active phase where users are engaged in a user communication; a follow-up phase occurring after the occurrence of a user communication; and a reoccurrence phase that reflects whether the user communication is reoccurring with a given period of time (e.g., weekly electronic meetings occurring in a month), among other examples. It is to be understood that active phases of a user communication may be segmented (e.g., first active phase, second active phase, third active phase), where a more micro-level analysis can be used to analyze the occurrence of a user communication. Active phases may correspond to a time period that has elapsed during the occurrence of a user communication (e.g., every 10 minutes) and/or a correspondence with an agenda or guide for conducting a user communication. For instance, if a user pre-prepared an agenda and shared it with other users, active phase evaluation may correspond with topics identified in the agenda. This type of distinction may be derived from analysis of context information for the state of user communication where data associated with an electronic meeting or the like (including an agenda) may be identified.

As indicated above, the points in the lifecycle of the user communication may comprise a reoccurrence phase that reflects whether a user communication is reoccurring within a given time period (e.g., identified by developers). This information is valuable to determining a relevance of data as it is contextually important to understand the audience of a user communication such as whether the users are familiar with one another through prior communications. A common occurrence is that where a large team of users is on a call with other users they do not really know. This may greatly impact how much (or how little) users may want to share on a call, what questions they have (e.g., Who is this person? What is their role?) and the overall flow of a user communication including topics discussed. To better understand the dynamics between users, the fourth scoring metric is configured to understand the full picture of where users are at in a user communication and their prior interactions. In technical instances where users have not interacted before it may be useful to generate and present data insights that help the users get to know one another. In technical instances where users have had reoccurring meetings, it may be more useful to generate and present data insights that are more focused on specific topics. In any example, the contextual analysis of any relevance evaluation is aimed at advancing the user communication (and topics thereof).

The contextual insight generation component 106 and/or the component for implementation of trained AI processing 108 are further configured to generate data insights. Exemplary data insights are intended to be data identified in the user context data and/or telemetry data derived from analysis thereof. Data insights may be generated using data from specific portions of the user context data indicating relationships to the context information collected for the current state of the user communication. In one example, a plurality of data insights may be generated for any identified user context data that satisfies a threshold distance evaluation after curating the stored knowledge graph based on the context information collected. Distance evaluation relative to a stored knowledge graph has been described in the foregoing description. Developers may set a threshold for the distance evaluation to determine data insights to generate relative to the context information collected. It is to be recognized that a threshold for distance evaluation can vary at the discretion of the developers. As an example, a threshold distance evaluation may be configured to evaluate a distance between nodes in the stored knowledge graph after curating the stored knowledge graph using the context information. However, as identified above, a distance evaluation may factor in any analysis of any type of connection within the knowledge graph (e.g., a threshold may be set for the number of nodes in between connections and also evaluate the number of edges therebetween as well). Moreover, in further examples, relevance scoring, as previously described, may be further utilized in the process of determining which data insights to generate. That is, relevance scoring can be analyzed prior to generation of data insights and used to aid determination as to what data to utilized for generation of data insights. In alternative examples, a specific number of data insights may be generated even if some of the data insights are generated from user context data that does not satisfy the threshold for the distance evaluation. For instance, if there are only a select number of data insights that satisfy an initial threshold, that threshold may be modified so that an appropriate number of data insights may be generated.

It is noteworthy that not all of the data insights that are generated may be immediately presented to users (or even presented at all). As referenced in the foregoing description, processing efficiency related to generation of data insights may be improved by generating data insights in an offline scenario (e.g., where users are not actively using an application/service for a user communication), where previously generated data insights can then be recalled at a relevant point in time such an update state of the user communication. At that time, relevance scoring analysis can be applied to curate previously generated data insights for presentation thereby improving processing efficiency by utilizing already generated data insights and reducing a processing load on devices at runtime. This is because contextual states associated with a user communication (or multiple user communications) may be similar. As such, subsequent relevance evaluation can focus on the context information that is different and curating the data insights that have been previously generated. In some technical instances, new data insights may be generated for an updated state of a user communication. However, the amount of data insights that may need to be generated in that case can be greatly reduced by leveraging previous data insight generation.

The contextual insight generation component 106 and/or the component for implementation of trained AI processing 108 are further configured to execute relevance scoring on generated data insights to identify a relevance of the generated data insights to the state of the user communication. In some examples, each of the generated data insights may be scored using the relevance scoring. In other examples where some data insights are generated that do not satisfy an initial threshold for distance evaluation, only data insights generated from user context data that satisfies the threshold for distance evaluation may be scored. The relevance scoring applies one or more trained relevance models to score a relevance of a data insight to the context information collected about a current state of the user communication. Non-limiting examples of trained relevance models and aggregate scoring have been described in the foregoing description and may be applied to score a relevance of the generated data insights.

Moreover, the contextual insight generation component 106 and/or the component for implementation of trained AI processing 108 are further configured to select a subset of one or more data insights for presentation. In some examples, a selection of the subset of one or more data insights may be relative to the current state of the user communication to users associated with the user communication. In other examples, the selection of data insights is based upon an aggregation of states of a user communication or even multiple user communications. Trained AI processing, as described herein, may be configured to execute processing operations for both the selection of data insights for inclusion in a representation of data insights as well as generating a representation of data insights that reflects a subset of one or more data insights that are selected for presentation. In some examples, a plurality of representations of data insights may be generated, where representations of data insights can be presented in waves to reflect different contextual states throughout a user communication. As such, it is intended to be recognized that representations of data insights can be pre-generated for later provision if a context state of a user communication changes.

A selection of the subset of data insights may be determined based on analysis of an evaluation result. In one example, the evaluation result is a result of analysis of the relevance scoring from application of the one or more trained relevance models. In further examples, the evaluation result is determined from a collective evaluation from: analysis of the relevance scoring; and a determination of a level of urgency for provision of a specific type of data insight. The determination of the level of urgency may be generated based on analysis of the temporal designation and user-specific signal data associated with the two or more users. For instance, the temporal designation may be a good indication as to where users are at in the user communication. Combine that with an analysis of user-specific signal data (e.g., indicating what the user is working on, whether they are speaking, how busy they, what files, apps/services they have open) and a strong predictive determination can be made as to a timing of when to provide a data insight relative to the user communication.

Furthermore, selection of the subset of one or more data insights may further comprise generating a representation of the subset of data insights that are selected. A GUI is improved through the novel representations of data insights that are created to display generated data insights and highlight their relevance to a user communication. A representation of subset of data insights refers to how the data insight is illustrated/presented to a user. Non-limiting visual examples of representations of data insights are illustrated in FIGS. 3A-3D.

Exemplary representations may provide data insights in one or more of the following forms: sentences, audio, video, images, tables, graphs, rich data objects (e.g., interactive content including hyperlinked fields, animation, etc.), augmented annotations, or a combination thereof. Augmented annotations are intended to cover instances where data presented though an application/service is augmented (amended including adding new content/removing content) based on the current state of the user communication. Augmented annotations may occur on the fly (in real-time or near real-time) and may be in any of the forms of representation previously described. That is, augmented annotations are usable to update the form and content presented thereof with respect to data objects that are traditionally presented to users through applications/services. One instance of an augmented annotation is labeling a user with a specialty. For example, a portrait (name+profile) for a user involved in an electronic meeting or remote call might be amended to also say "Knows about: server communication architecture; Security vulnerabilities in HTTP protocols". These insights or annotations change dynamically as the topic of the user communication evolves. Data insights might be shared between everyone and shown in the same way to all users, or they might be unique per user, or a combination of both.

As user communications may be ongoing, the present disclosure further provides technical novelty in the creation of aggregated representations of generated data insights. Different data insights may be contextually relevant to different temporal designations of a user communication (or multiple user communications). In cases where a user communication extends over a long period of time or is otherwise very technically complex (e.g., topic-wise), the present disclosure describes processing operations that enable generation and provision of a dynamic timeline of data insights. The dynamic timeline of data insights is configured to illustrate an aggregated chronological representation of data insights at different context states throughout a user communication (or multiple user communications). The contextual insight generation component 106 and/or the component for implementation of trained AI processing 108 may be configured to generate an aggregated representation of data insights based on a result of analysis of the context information collected for a state (or states) of the user communication(s). For instance, it may be determined that an electronic meeting is a reoccurring meeting that builds off prior context of a previous meeting. A dynamic timeline of data insights may be generated providing a visual link between the various contexts including identification of related temporal designations thereof. As an example, a version of a dynamic timeline of data insights may identify a temporal designation associated with a previous meeting as well as contextually relevant data insights for that temporal designation and do the same for a current state of an electronic meeting. In further technical examples, multiple different contextual states of a user communication may be detected as a user communication progresses. A dynamic timeline of data insights may be generated that provides multiple temporal designations for an electronic meeting and data insights related thereto. This may help provide the users with visual understanding of a how a user communication evolved and be a great reference point should the users return back at a later point in time to recall the events of a user communication.

As referenced in the foregoing description, processing operations described in the present disclosure may customize a presentation layout of a representation of a data insight based on analysis of the contextual state of a user communication. Customization of a presentation layout may comprise executing processing that determines the types of content (e.g., form/format of representations) to include in a representation as well as the amount of content to display for users. In one example, a presentation layout may comprise selecting a summary information format. A summary information format provides summary information for a data insight where the amount of data to initially display to a user is pre-determined. A plurality of summary information formats may be identified and selectable to present a data insight within an exemplary representation. As an example, a summary information format may be selected based on an analysis of one or more of: attributes of context information collected; a result of generated relevance scoring at any point in the processing described herein; and the determination as to the level of urgency for providing a notification to users. That is, any of those types of contextual data may be utilized to dictate what summary information format is selected for presentation. For instance, if users are actively engaged in an electronic meeting with a variety of content open and being accessed, an analysis of the above identified contextual data may lead to a determination that it may make sense to provide a representation of a data insight that does not overwhelm the user and take up a lot of visual space in a meeting display. Exemplary summary information formats may also correspond with specific types of GUI elements, where the summary information may be presented in a specific type of GUI element based on the analysis previously described. Non-limiting examples of such types of GUI elements comprise but are not limited to: GUI callouts; banners; notifications; messages; and GUI menus and windows, among other examples.

Moreover, an exemplary GUI may further be improved, via provision of representations of data insights, by enabling interactions with the representations. This may comprise providing user interface features/elements enabling the user to request more details on an insight or "navigate" through the parts of the knowledge graph that are related to the call. Providing a GUI representation that allows a user to connect directly to the stored knowledge graph (e.g., see relevant data and/or potentially provide user feedback for update of the knowledge graph) provides a great technical benefit to continued management of the knowledge graph. In further examples, GUI elements for providing user feedback about representations of data insights may be provided. This data can be tracked and used to help update trained relevance modeling for relevance scoring during subsequent contextual evaluations.

The contextual insight generation component 106 may further be configured to interface with the application/service component 104 to enable rendering and presentation of representations of data insights. In some examples, the contextual insight generation component 106 is configured to render representations of data insights for presentation in a GUI of an application/service. This may occur in technical instances where the contextual insight generation component 106 is interfacing with the application/service component 104 (e.g., through an API or listener of the like) and is charged with presenting the representations of data insights. In one technical instance, the contextual insight generation component 106 may be configured as a component operating on a client computing device (e.g., user computing device 102).

In other technical instances, the contextual insight generation component 106 may be operating on a computing device that is interfacing with an application/service (e.g., executing on a client computing device) via a remote network connection. The contextual insight generation component 106 may be configured to transmit data for rendering of data insights including the representation of the data insights. For instance, the contextual insight generation component 106 is configured to transmit data for rendering a representation of data insights to a client device (e.g., client computing device such as the user computing device 102) that is displaying a GUI for an application/service (e.g., an application/service that is used to provide a GUI for a user communication). In a more specific example, the contextual insight generation component 106 is configured to transmit data for rendering of data insights to an application/service that is executing on a client computing device. The application/service component 104 may then be configured to receive that transmission and utilize the data for rendering the representation of data insights in a GUI. In some cases, the transmission of data for rendering the representation of data insights may occur at the time when the representation is to be rendered. In other technical instances, the application/service component 104 may further utilize timing information, transmitted as part of the data for rendering of the representation of data insights, as a cue for to determine a most appropriate time to render the representation.

In at least technical instance, a representation of data insights may be displayed in a GUI that is different from that which is being used to conduct the user communication. For instance, a representation of a data insight may be presented in a GUI of another application/service (e.g., digital assistant application/service, email service, messaging service) while the user is utilizing another GUI to conduct an electronic meeting/remote call. In some alternative examples, a representation of a subset of data insights may be presented in a GUI of an application/service executing on another device. As identified in the foregoing, the present disclosure is configured to work with any type of computing device including but not limited to VR and AR devices. In technical instances where it is detected that a user is accessing content through a VR device or AR device, the processing of the present disclosure is configured to generate a representation of data insights that is tailored for the VR or AR device. In some examples, a user may be accessing a user communication through a VR or AR device, where a representation of data insights can be rendered for VR device or AR device in the same GUI that is used to participate in the user communication. In some technical examples, users may be utilizing multiple virtual workspaces to view content across one or more application/services, where representations of data insights can be appropriately rendered across the virtual workspaces. For instance, a dynamic timeline of data insights may be adjustable to be represented across a plurality of virtual workspaces that are provided digitally by a VR device or AR device.

In cases where trained AI processing is applied, general application of trained AI processing including creation, training and update thereof is known to one skilled the field of art. Above what is traditionally known, trained AI processing may be adapted to execute specific determinations described herein with reference to the contextual insight generation component and processing operations executed thereby. Exemplary AI processing may be applicable to aid any type of determinative or predictive processing by the contextual insight generation component, via any of: supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM) neural networks (e.g., convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. Furthermore, a component for implementation of trained AI processing 108 may be configured to apply a ranker to generate relevance scoring to assist with any processing determinations by the contextual insight generation component 106. Non-limiting examples of relevance scoring, and specific metrics used for relevance scoring, have been described in the foregoing description. As previously referenced, relevance scoring may be based on individual relevance scoring metrics described herein or an aggregation of said scoring metrics. In some alternative examples where multiple relevance scoring metrics are utilized, a weighting may be applied that prioritizes one relevance scoring metric over another depending on the context information collected for a state of a user communication.

As referenced in the foregoing description, knowledge repositories 110 may be accessed to obtain data for generation, training and implementation of the component for implementation of trained AI processing 108 as well the operation of processing operations by that of the application/service component 104 and the contextual insight generation component 106. Knowledge resources comprise any data affiliated with a software application platform (e.g., Microsoft®, Google®, Apple®, IBM®) as well as data that is obtained through interfacing with resources over a network connection including third-party applications/services. Knowledge repositories 110 may be resources accessible in a distributed manner via network connection that may store data usable to improve processing operations executed by the acoustic analysis component 106. Examples of data maintained by knowledge repositories 110 comprises but is not limited to: collected signal data (e.g., from usage of an application/service, device-specific, user-specific); telemetry data including past usage of a specific user and/or group of users; corpuses of annotated data used to build and train AI processing classifiers for trained relevance modeling; access to entity databases and/or other network graph databases usable for building and maintenance of a stored knowledge graph; web-based resources including any data accessible via network connection including data stored via distributed data storage; trained bots including those for natural language understanding; and application/service data (e.g., data of applications/services managed by the application/service component 104) for execution of specific applications/services including electronic document metadata, among other examples. Moreover, knowledge repositories 110 may further comprise access to a cloud-assistance service that is configured to extend language understanding processing including audio signal analysis. This may aid the conversion of audio signals to text for analysis of a state of a user communication. The cloud-assistance service may provide the contextual insight generation component 106 and/or application/service component 104 with access to larger and more robust library of stored data for execution of language understanding/natural language understanding processing. Access to the cloud-assistance service may be provided when an application/service is accessing content in a distributed service-based example (e.g., a user is utilizing a network connection to access an application/service), as the data of the cloud-assistance service may be too large to store locally. In further examples, the contextual insight generation component 106 may be configurable to interface with a web search service, entity relationship databases, etc., to extend a corpus of data to make the most informed decisions when generating determinations on behalf of a user. In even further examples, telemetry data may be collected, aggregated and correlated (e.g., by an interfacing application/service) to further provide the contextual insight generation component 106 with on demand access to telemetry data which can aid determinations generated thereby.

Figure 2:
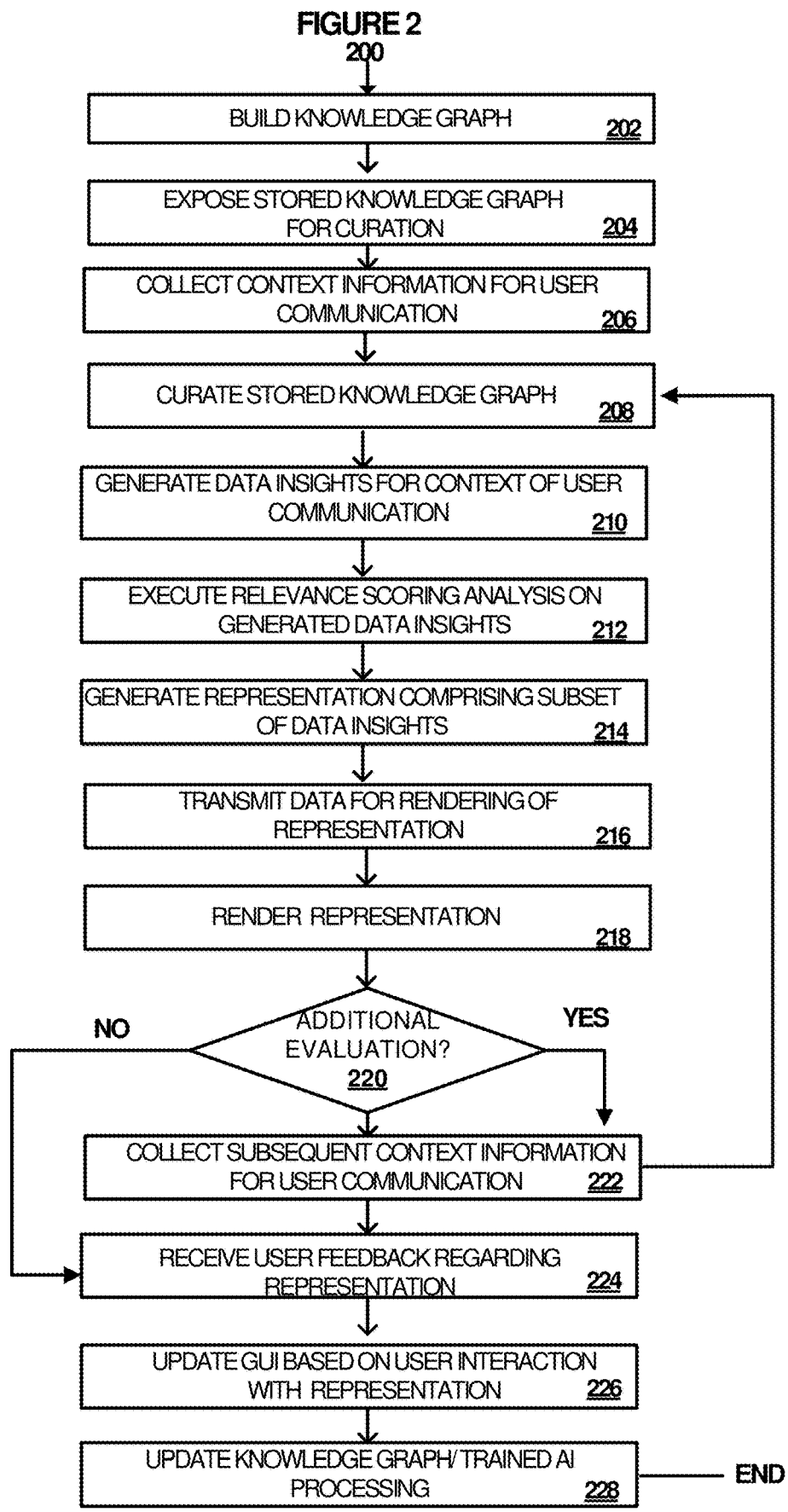
FIG. 2 illustrates an exemplary method related to automated generation and provision of data insights that are relevant to a contextual state of a user communication, with which aspects of the present disclosure may be practiced.

FIG. 2 illustrates an exemplary method 200 related to automated generation and provision of data insights that are relevant to a contextual state of a user communication, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100. Processing operations performed in method 200 may correspond to operations executed by a system and/or service that execute computer modules/programs, software agents, application programming interfaces (APIs), plugins, AI processing including application of trained data models, intelligent bots, neural networks, transformers and/or other types of machine-learning processing, among other examples. In one non-limiting example, processing operations described in method 200 may be executed by a component such as a contextual insight generation component 106 (of FIG. 1) and/or a component for implementation of trained AI processing 108. In distributed examples, processing operations described in method 200 may be implemented by one or more components connected over a distributed network. For example, components may be executed on one or more network-enabled computing devices, connected over a distributed network, that enable access to user communications.

Method 200 begins at processing operation 202, where an exemplary knowledge graph is built or generated. Description of a knowledge graph and processing operations for building an exemplary knowledge graph have been provided in the foregoing description. As also indicated in the foregoing, the knowledge graph may be stored for access thereto. As a non-limiting example, the knowledge graph may be stored on a distributed data storage or distributed database (e.g., as part of knowledge repositories 110 of FIG. 1).

Flow of method 200 may proceed to processing operation 204. At processing operation 204, the stored knowledge graph is exposed for real-time (or near real-time) evaluation of a state of a user communication. The stored knowledge graph may be exposed (processing operation 204) for access over a network connection.

At processing operation 206, context information pertaining to a state of a user communication may be collected. Context information about a state of a user communication may be collected and analyzed, relative to user context data of the knowledge graph to identify relevant user context data. Operation 206 comprises execution of processing operations that analyze data associated with a user communication. Data associated with user communication may be any data or information that is used for management of a user communication. Management of a user communication is intended to cover any example where an application/service is applied to: manage scheduling of a user communication (e.g., remote meeting, electronic meeting invites thereof) which may occur at a later point in time; enable engagement of one or more users in a user communication;

analyze signal data associated with users/computing devices/applications/services; and/or provision of services that support a user communication (e.g., digital personal assistant application/service, notetaking application/service, recording application/service, application/service providing telemetry data analysis). As a contextual state of a user communication may dynamically change over time, data associated with a user communication can be analyzed at any point including prior to the occurrence of a user communication and even after the conclusion of a user communication. It is to be further understood that collection and analysis of context information regarding a state of a user communication further extends to instances where an aggregate analysis is derived from analysis of multiple user communications. In one non-limiting example, the user communication is an electronic meeting or a remote call.

One or more components, executing processing operation 206 may be configured to target specific types of context information to identify a state (current state) of a user communication. For instance, context information identifying a state of a user communication may comprise but is not limited to: a temporal designation indicating a point in time relative to an occurrence of a user communication; user-specific identification for users associated with a state of the user communication; one or more topics associated with a state of the user communication; signal data including user-specific signal data identified at the temporal designation or another point in time relative to the temporal designation; and electronic files associated with the user communication including electronic files attached to data associated with the user communication. For example, context information may be collected regarding a state of an electronic meeting, whether that meeting is scheduled (yet to be conducted); currently ongoing or has concluded. As indicated in the foregoing description, contextual analysis may further yield determinations as to whether an electronic meeting is a reoccurring meeting.

Once exemplary context information is collected for a state of a user communication, flow of method 200 may proceed to processing operation 208. At processing operation 208, the storage knowledge graph is curated using the context information collected. In any example, the context information collected may be converted into queries using the context information, where the queries are usable to search the user context data of the storage knowledge graph for relevant data and relationships therebetween. Non-limiting of examples of types of relevant user context data and relationships that may be identified for the context information comprise but are not limited to: user-specific entity data for users associated with a user communication; collaborative relationships previously existing between users; file access relationships indicating electronic files access by users (individually and/or collaboratively); and relevant topics including topics identified from prior communications of the users, among other examples. In some examples, modeling of a trained AI processing is configured to utilize the various aspects of context information as input features and assign a weighting to specific types of the context information to aid curation of the user context data of the knowledge graph. The aim is to identify an assortment of relationships in the user context that can be used to generate a variety of data insights, where data insights reflect quantitative relationships as well as qualitative relationships. As a state of a user communication is dynamic, it is important to utilize the temporal designation, of the collected context information, to identify relationships that are most relevant to the state of the user communication.

In examples where AI processing is implemented to improve the curation process, a trained relevance model (or multiple trained relevance models) are applied that are configured for the specific purposes of utilizing the context information collected to identify relevant user context data for data insight generation. In other examples, curation of the knowledge graph may occur through a programmed software module or API that is configured to enable developer access to the knowledge graph. Curation processing (processing operation 208) may further comprise evaluating distance measurements between connecting entities within the stored knowledge graph. A distance measurement associated with a connection between entities may factor in one or more of a number of: nodes, vertices, links, edges, or a combination thereof. Developers may set a threshold relative to the distance evaluation to filter the user context data as an initial relevance assessment relative to the context information. As an example, a threshold distance evaluation may be configured to evaluate a distance between nodes in the stored knowledge graph after curating the stored knowledge graph using the context information. However, it is to be recognized that a threshold for distance evaluation can vary at the discretion of the developers. In some technical instances, the types of context information collected may be utilized to define a threshold for the distance evaluation. For instance, if certain attributes of the context information are more relevant (or some being nonexistent), then it may make sense to adjust the threshold to identify additional relevant data for insight generation. Curation (processing operation 208) of the knowledge graph may further comprise application of an instance of relevance scoring as previously described (e.g., in the description of system diagram 100 of FIG. 1).

Once the stored knowledge graph has been curated, the flow of method 200 may proceed to processing operation 210. At processing operation 210, data insights may be generated for a user communication. Processing operation 210 may comprise generating data insights that are reflective of a current state of a user communication. However, as previously described, data insight generation may be streamlined to identify contextually relevant data insights even in a predictive fashion so that data insights can be efficiently recalled when needed (e.g., when a subsequent state of a user communication calls for specific data insights). Exemplary data insights are intended to be data identified in the user context data and/or telemetry data derived from analysis thereof. Data insights may be generated using data from specific portions of the user context data indicating relationships to the context information collected for the current state of the user communication. In one example, a plurality of data insights may be generated for any identified user context data that satisfies a threshold distance evaluation after curating the stored knowledge graph based on the context information collected. Distance evaluation relative to a stored knowledge graph has been described in the foregoing description. Developers may set a threshold for the distance evaluation to determine data insights to generate relative to the context information collected. It is to be recognized that a threshold for distance evaluation can vary at the discretion of the developers. As an example, a threshold distance evaluation may be configured to evaluate a distance between nodes in the stored knowledge graph after curating the stored knowledge graph using the context information. Generation (processing operation 210) of data insights may further comprise application of an instance of relevance scoring as previously described (e.g., in the description of system diagram 100 of FIG. 1).

Flow of method 200 may then proceed to processing operation 212. At processing operation 212, relevance scoring is executed to select data insights that are most contextually relevant to a context state of a user communication. As previously discussed, the relevance scoring applies one or more trained relevance models configured to score a relevance of a data insight to the context information collected about a current state of the user communication. As indicated in the foregoing description, relevance models may be selectively applied in some technical instances, where attributes of the collected context information may be utilized to identify which relevance models are most appropriate to evaluate a relevance of user context data identified. In one example, multiple rounds of relevance scoring may be executed, where a plurality of different trained relevance models may be applied to evaluate different aspects of relevance between the user context and the collected context information associated with a state of a user communication. In some technical instances where multiple trained relevance models are applied, an overall relevance score may be determined that is an aggregation of relevance scores generated by each trained relevance model. In other technical instances where multiple trained relevance models are applied, a threshold scoring evaluation may be utilized to help filter out connections identified in the user context data before subsequent relevance evaluation is conducted by additional trained relevance models. For instance, a first trained relevance model may be applied and if a threshold relevance score is not reached then additional relevance evaluation is not necessary. Developers may set thresholds at their discretion without departing from the spirit of the present disclosure.

Non-limiting examples of trained relevance models has been provided in the foregoing description. For reference, at least four different trained relevance models were described, comprising but not limited to the following. A first trained relevance model may be configured to generate a first scoring metric for evaluating relevance of user context data to collected context information based on the threshold distance evaluation previously described. A second trained relevance model may be configured to generate a second scoring metric for evaluating relevance of user context data to collected context information based on an analysis of access to content including an amount of prior collaboration between the two or more users. A third trained relevance model may be configured to generate a third scoring metric for evaluating connections between user context data for relevance based on an analysis of based on a relevance to the one or more topics, identified from the context information at the temporal designation, for a current state of a user communication. A fourth trained relevance model may be configured to generate a fourth scoring metric for evaluating connections between user context data for relevance based on an analysis of the temporal designation identified for a current state of a user communication.

Flow of method 200 may then proceed to processing operation 214. At processing operation 214 a representation of data insights is generated. An exemplary representation of data insights comprises a subset of one or more data insights that are selected from a plurality of data insights generated. Processing operation 214 may comprise selecting a subset of one or more data insights for presentation from a plurality of data insights generated. In some examples, a selection of the subset of one or more data insights may be relative to the current state of the user communication to users associated with the user communication. In other examples, the selection of data insights is based upon an aggregation of states of a user communication or even multiple user communications. Trained AI processing, as described herein, may be configured to execute processing operations for both the selection of data insights for inclusion in a representation of data insights as well as generating a representation of data insights that reflects a subset of one or more data insights that are selected for presentation. In some examples, a plurality of representations of data insights may be generated, where representations of data insights can be presented in waves to reflect different contextual states throughout a user communication. As such, it is intended to be recognized that representations of data insights can be pre-generated for later provision if a context state of a user communication changes.

A selection of the subset of data insights may be determined based on analysis of an evaluation result. In one example, the evaluation result is a result of analysis of the relevance scoring from application of the one or more trained relevance models. In further examples, the evaluation result is determined from a collective evaluation from: analysis of the relevance scoring; and a determination of a level of urgency for provision of a specific type of data insight. The determination of the level of urgency may be generated based on analysis of the temporal designation and user-specific signal data associated with the two or more users. For instance, the temporal designation may be a good indication as to where users are at in the user communication. Combine that with an analysis of user-specific signal data (e.g., indicating what the user is working on, whether they are speaking, how busy they, what files, apps/services they have open) and a strong predictive determination can be made as to a timing of when to provide a data insight relative to the user communication.

Furthermore, processing operation 214 may comprise generating a representation of the subset of data insights that are selected. A representation of subset of data insights refers to how the data insight is illustrated/presented to a user. A GUI is improved through the novel representations of data insights that are created to display generated data insights and highlight their relevance to a user communication. Non-limiting visual examples of representations of data insights are illustrated in FIGS. 3A-3D.

As referenced in the foregoing description, processing operations, including processing operation 214, may comprise customization of a presentation layout of a representation of a data insight based on analysis of the contextual state of a user communication. Customization of a presentation layout may comprise executing processing that determines the types of content (e.g., form/format of representations) to include in a representation as well as the amount of content to display for users. In one example, a presentation layout may comprise selecting a summary information format. A summary information format provides summary information for a data insight where the amount of data to initially display to a user is pre-determined. A plurality of summary information formats may be identified and selectable to present a data insight within an exemplary representation. As an example, a summary information format may be selected based on an analysis of one or more of: attributes of context information collected; a result of generated relevance scoring at any point in the processing described herein; and the determination as to the level of urgency for providing a notification to users. That is, any of those types of contextual data may be utilized to dictate what summary information format is selected for presentation. For instance, if users are actively engaged in an electronic meeting with a variety of content open and being accessed, an analysis of the above identified contextual data may lead to a determination that it may make sense to provide a representation of a data insight that does not overwhelm the user and take up a lot of visual space in a meeting display. Exemplary summary information formats may also correspond with specific types of GUI elements, where the summary information may be presented in a specific type of GUI element based on the analysis previously described. Non-limiting examples of such types of GUI elements comprise but are not limited to: GUI callouts; banners; notifications; messages; and GUI menus and windows, among other examples.

As indicated in the foregoing description, generation of a representation of a subset of data insights may comprise creation of an aggregated representations of generated data insights. Different data insights may be contextually relevant to different temporal designations of a user communication (or multiple user communications). In cases where a user communication extends over a long period of time or is otherwise very technically complex (e.g., topic-wise), the present disclosure describes processing operations that enable generation and provision of a dynamic timeline of data insights. The dynamic timeline of data insights is configured to illustrate an aggregated chronological representation of data insights at different context states throughout a user communication (or multiple user communications). The contextual insight generation component 106 and/or the component for implementation of trained AI processing 108 may be configured to generate an aggregated representation of data insights based on a result of analysis of the context information collected for a state (or states) of the user communication(s).

Flow of method 200 may proceed to processing operation 216. At processing operation 216, data for rendering of a representation of a subset of one or more data insights may be transmitted. In some examples, representations of data insights are rendered for presentation in a GUI of an application/service. This may occur in technical instances where a component for representation generation (e.g., data insight generation component 106 of FIG. 1) is interfacing (e.g., through an API or listener of the like) with the application/service component 104 (of FIG. 1) that is in charge of presenting the representations of data insights. In one technical instance, the contextual insight generation component 106 is configured as a component operating on a client computing device (e.g., user computing device 102). In other technical instances, a contextual insight generation component 106 may be operating on a computing device that is interfacing with an application/service (e.g., executing on a client computing device) via a remote network connection. The contextual insight generation component 106 may be configured to transmit (processing operation 216) data for rendering of data insights including the representation of the data insights. For instance, the contextual insight generation component 106 is configured to transmit (processing operation 216) data for rendering a representation of data insights to a client device (e.g., client computing device such as the user computing device 102) that is displaying a GUI for an application/service (e.g., an application/service that is used to provide a GUI for a user communication). In a more specific example, the contextual insight generation component 106 is configured to transmit (processing operation 216) data for rendering of data insights to an application/service that is executing on a client computing device. The application/service component 104 may then be configured to receive that transmission and utilize the data for rendering the representation of data insights in a GUI. In some cases, the transmission (processing operation 216) of data for rendering the representation of data insights may occur at the time when the representation is to be rendered. In other technical instances, the application/service component 104 may further utilize timing information, transmitted as part of the data for rendering of the representation of data insights, as a cue for to determine a most appropriate time to render the representation.

Flow of method 200 may proceed to processing operation 218. At processing operation 218, a representation (or representations) of a subset of one or more data insights may be presented in a GUI of an application/service. In one example, processing operation 218 comprises presenting an exemplary representation in a GUI of an application/service that is presenting a user communication. In at least technical instance, a representation of data insights may be displayed in a GUI that is different from that which may be presented in a GUI of another application/service (e.g., digital assistant application/service, email service, messaging service) while the user is utilizing another GUI to conduct an electronic meeting/remote call. In some alternative examples, a representation of a subset of data insights may be presented in a GUI of an application/service executing on another device. As identified in the foregoing, the present disclosure is configured to work with any type of computing device including but not limited to VR and AR devices. In technical instances where it is detected that a user is accessing content through a VR device or AR device, the processing of the present disclosure is configured to generate a representation of data insights that is tailored for the VR or AR device. In some examples, a user may be accessing a user communication through a VR or AR device, where a representation of data insights can be rendered for VR device or AR device in the same GUI that is used to participate in the user communication. In some technical examples, users may be utilizing multiple virtual workspaces to view content across one or more application/services, where representations of data insights can be appropriately rendered across the virtual workspaces. For instance, a dynamic timeline of data insights may be adjustable to be represented across a plurality of virtual workspaces that are provided digitally by a VR device or AR device.

Method 200 may then proceed to decision operation 220, where it is determined whether additional contextual evaluation is necessary for evaluating a state of a user communication. In cases where a user communication has yet to be conducted or is continuing (e.g., if users are engaged in the user communication), decision operation 220 may branch "YES" and flow of method 200 may proceed to processing operation 222. At processing operation 222, subsequent context information regarding an updated state of a user communication may be collected. Processing of method 200 may then return back to processing operation 208, where the stored knowledge graph may be curated using the subsequent context information. It is to be understood that a second round of contextual state evaluation of a user communication may not require all of the repeat processing operations to be executed. In some examples, flow of method 200 may return, from processing operation 222, to processing operation 210, where data insights are selected for inclusion in a subsequent representation of data insights. In other examples, flow of method 200 may return, from processing operation 222, to processing operation 214 where representations of data insights, that were previously generated, may be recalled.

In cases where additional contextual evaluation, as to a state of a user communication, is not required, decision operation 220 may branch "NO" and flow of method 200 may proceed to processing operation 224. At processing operation 224, user feedback may be received regarding an interaction with a representation of a subset of one or more data insights. User feedback may comprise but is not limited to: user interactions with GUI elements of a representation (e.g., scrolling through content thereof, selecting links/ requesting additional data) or providing user opinions as to the relevance of the data insight and/or contextual representation (e.g., is the content useful, do users like it, would they like to see additional similar data insights). Such information may be propagated to the contextual insight generation component 106 and may be used to update/train AI processing that is utilized for relevance scoring and/or generation of representations of data insights.

As a note, it is to be understood that some additional examples of method 200 comprise synchronous evaluation of an updated state of a user communication as well as management of user interaction with a representation. That is, evaluation of subsequent context information for a state of a user communication may be conducted by a contextual insight generation component 106 (of FIG. 1) while an application/service component 104 may control interactions with content presented through a GUI of an application/ service. As previously discussed in the foregoing, exemplary components, such as the contextual insight generation component 106 and the application/service component 104, may interface to data to be shared therebetween.

In examples where the user feedback is an interaction with the representation of a subset of one or more data insights, flow of method 200 may then proceed to processing operation 226, where a GUI is updated based on a result of a user interaction with the representation.

In any example, flow of method 200 may proceed to processing operation 228, where data associated with the stored knowledge graph may be updated. In some technical examples, data associated with the trained AI processing may also be updated (e.g., where user feedback was provided on a representation of a subset of data insights).

FIGS. 3A-3D illustrate exemplary processing device views associated with user interface examples for an improved user interface that is configured to enable provision of representations of data insights that are relevant to a contextual state of a user communication, with which aspects of the present disclosure may be practiced. FIGS. 3A-3D provide non-limiting front-end examples of processing described in the foregoing including system diagram 100 and method 200 (FIG. 2).

FIG. 3A presents processing device view 300, illustrating a GUI 302 of an application/service (e.g., collaborative communication application/service) that is configured to enable presentation of a user communication. In the example shown in processing device view 300, the user communication is an electronic meeting being conducted through a collaborative communication application/service, where the GUI 302 of the collaborative communication application/ service displays a state of the electronic meeting. The GUI 302 is an adapted GUI that is configured to provide an application command control and associated GUI elements including those associated with representations of data insights. As shown in GUI 302, the electronic meeting comprises three meeting participants ("Tom", "Alex" and "Romain") at the displayed point in time. User contact cards (304, 306 and 308) respectively identify the three users. As indicated in the foregoing description, back-end processing analysis collects context information about a state of a user communication (e.g., the electronic meeting) and ultimately generates representations of data insights that are contextually relevant to the state of the user communication.

In the example shown in processing device view 300, first representations of data insights are shown as augmented annotations 310, 312 and 314 of the user contact cards 304, 306 and 308, respectively. A possible result of the analysis of the collected context information, relative to the user context data for users ("Tom", "Alex" and "Romain") may have yielded a determination that this is the first meeting amongst this team of users and the users of the team may be unfamiliar with the other users, including their expertise and proficiencies. As such, the augmented annotations 310, 312 and 314 are real-time amendments to the user contact cards (304, 306 and 308) respectively providing contextually relevant information about each of the users. The augmented annotations 310-314 provide contextually relevant information comprises information about the expertise and proficiencies of the users because the meeting is a business meeting for a "Network Security Group" as well as recently accessed files that have associations to topics of interest for the group of users. Furthermore, automatic insight notification 316 illustrates another form of a representation of a data insight. The automatic insight notification 316 provides a message-like representation of a data insight including a common identified entity (e.g., link to "Network Security Group"). The automatic insight notification 316 highlights the result of the contextual analysis that identified that this is a first meeting amongst a team of users who may be unfamiliar with one another.

Figure 3B:
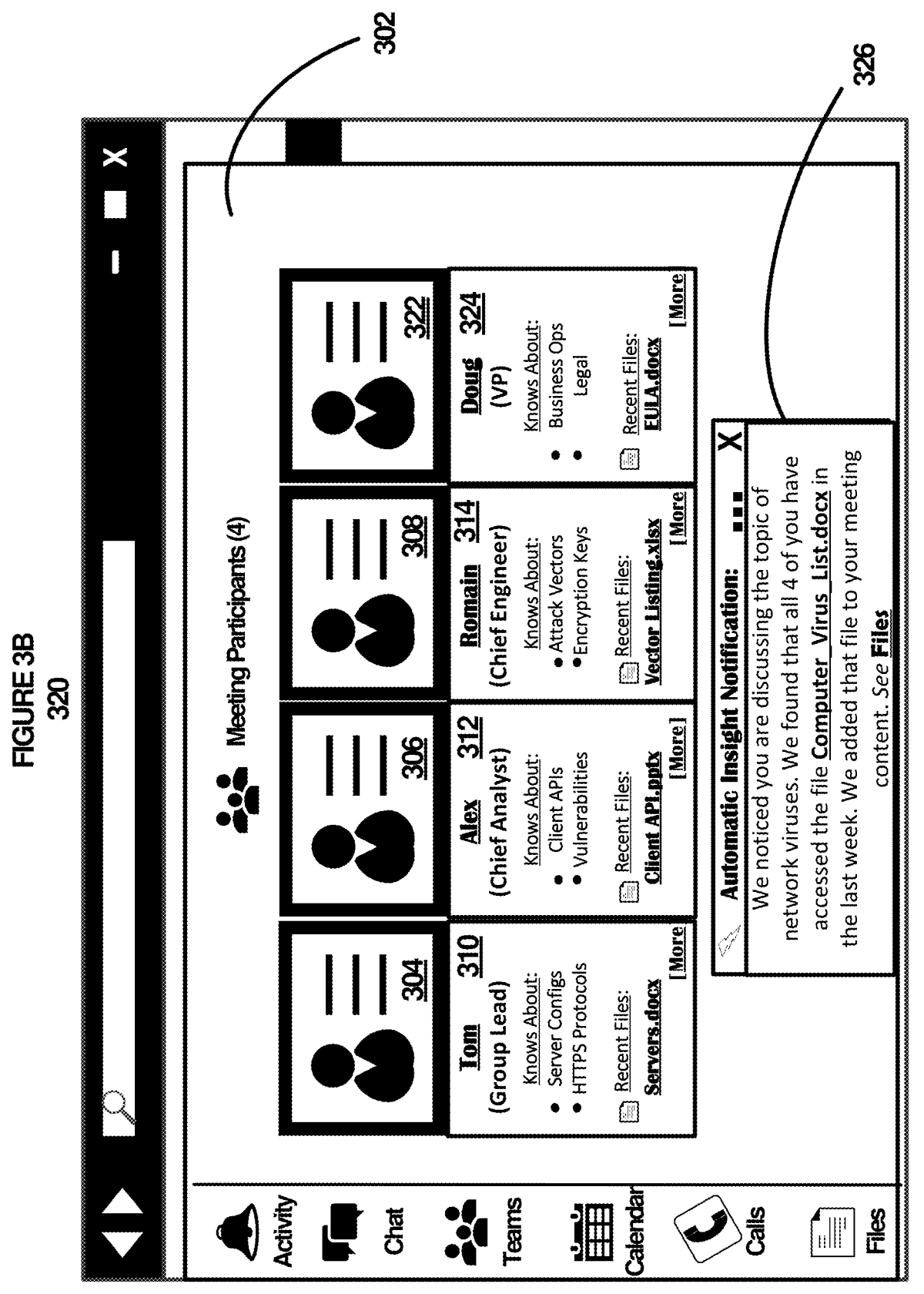

FIG. 3B presents processing device view 320, illustrating a continued example of the GUI 302 the collaborative communication application/service that is shown in processing device view 300 (FIG. 3A). In the example shown in processing device view 320, the state of electronic meeting has changed resulting in an automatic update to the GUI 302 to reflect that change through the presentation of additional/ new representations of data insights. It is to be recognized that prior generated representations of data insights may remain displayed in some cases and be removed in other cases. This type determination may further be part of the contextual analysis executed when determining an updated state of a user communication.

In the example shown in processing device view 320, the prior presented representations of data insights remain displayed. This is because the analysis yielded a determination that a fourth user ("Doug") has joined the electronic meeting. As this is still first meeting where the users are likely unfamiliar with one another, it makes the most sense to keep the representations of data insights (e.g., augmented annotations 310-314) so that the new user "Doug" can become acquainted with the other users via the automatically generated (and displayed) data insights. A user contact card 322 for the new user "Doug" is presented in processing device view 320 as well as an augmented annotation 324 of the user contact card 322, where the augmented annotation 324, similar to augmented annotations 310-314, provides contextual information relevant to the new user including expertise and proficiencies and recently accessed files that have associations to topics of interest for the group of users. Additionally, a new automatic insight notification 326 has been generated and displayed, replacing the prior automatic insight notification 316 previously presented. The new automatic insight notification 326 provides a contextually relevant data insight that helps advance the conversation and earmark a topic of interest determined at the current state of the electronic meeting.

FIG. 3C presents processing device view 340, illustrating a continued example of the GUI 302 the collaborative communication application/service that is shown in processing device view 320 (FIG. 3B). In the example shown in processing device view 340, the state of electronic meeting has changed resulting in an automatic update to the GUI 302 to reflect that change through the presentation of additional/new representations of data insights. Contextual analysis, for an updated state of the meeting (e.g., temporal designation), results in generation of new augmented annotations 342, 344, 346 and 348 respectively for user contact cards 304, 306, 308 and 322. In the example shown in processing device view 340, augmented annotations 342, 344, 346 and 348 provide visual cues (e.g., status and emojis) that are reflective of user involvement in the electronic meeting specifically the conversation. This can be extremely beneficial to users of the group, especially when someone is speaking, and another user would like to get their attention without interrupting the flow of the conversation. As discussed in the foregoing description, the representations of data insights can be automatically generated and automatically presented to users, through a GUI, without requiring user action to trigger the same. Through monitoring the state of the user communication, including user-specific signal data provided in the electronic meeting, the (predictive) visual cues can be automatically generated and displayed for users.

Moreover, processing device view 340 provides a visual illustration of an aggregated representation of data insights. A dynamic timeline of data insights 350 is illustrated providing an aggregated chronological representation of data insights at different context states throughout the electronic meeting. The dynamic timeline of data insights 350 provides a visual link between the various contexts of the electronic meeting including identification of related temporal designations thereof and relevant data insights for each of the temporal designations. For instance, temporal designations are identified at the start of the meeting ("@beginning of meeting"), an earlier point in time during the meeting ("5 minutes ago") and the current state of the electronic meeting ("current"). Contextually relevant data insights are also presented for each of those temporal designations in a segmented fashion. This may help provide the users with visual understanding of a how the electronic meeting evolved and is also a great reference point should the users return back at a later point in time to recall the events of the electronic meeting.

FIG. 3D presents processing device view 360, illustrating adaptability of the present disclosure to be applied to computing devices such as VR devices and AR devices. Processing device view 360, illustrating a continued (partial) example from what shown in processing device view 340 (FIG. 3C). In the example shown in processing device view 360, a user is utilizing a VR device 362 to conduct the electronic meeting and view content thereof. In processing device view 360, an update to the state of the electronic meeting causes the dynamic timeline of data insights 350 to be presented in a VR environment. The VR environment comprises a plurality of VR workspaces (364, 366 and 368). In processing device view 360, segmented portions of the dynamic timeline of data insights 350 are respectively shown in each of the VR workspaces, comprising: VR workspace 1 (364); VR workspace 2 (366); and VR workspace 3 (368). In an alternative example, the entirety of the dynamic timeline of data insights 350 may be presented in a single VR workspace where other VR workspaces may show other content of the electronic meeting (e.g., the GUI 302 of collaborative communication application/service) and/or GUIs of other applications/services.

FIG. 4 illustrates a computing system 401 suitable for implementing processing operations described herein related to generation and provision of data insights that are relevant to a contextual state of a user communication. As referenced above, computing system 401 may be configured to implement processing operations of any component described herein including exemplary contextual insight generation component(s) previously described. As such, computing system 401 may be configured to execute specific processing operations to solve the technical problems described herein, which comprise processing operations for intelligent and timely contextual analysis that is usable to improve data insight generation and provision that is reflective of a state of a user communication. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 may be connected to other computing devices (e.g., display device, audio devices, servers, mobile/remote devices, VR devices, AR devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1), processing operations described in method 200 (FIG. 2) and/or the accompanying description of FIGS. 3A-3D.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices, VR devices, AR devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing one or more contextual insight generation component(s) 406a as described herein. Software 405 may further comprise application/service component(s) 406b that provide applications/services as described in the foregoing description such as applications/services that enable access to data usable to engage in user communications and application/services that enable users to engage in user communications, among other examples.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: application command control specifically configured for control over a user communication including control over generated data insights and representations thereof; an improved GUI providing automatic notification of generated data insights; and generation and management of an exemplary dynamic data insight timeline, among other examples. User interface system 409 comprises a graphical user interface that presents graphical user interface elements representative of any point in the processing described in the foregoing description including processing operations described in system diagram 100 (FIG. 1), method 200 (FIG. 2) and front-end representations related to the description of FIGS. 3A-3D. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output) in conjunction with operation of exemplary applications/services (e.g., presentation broadcast service) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   collecting context information about a current state of an electronic meeting based on analyzing meeting data associated with the electronic meeting, wherein the context information collected comprises:
   a temporal designation indicating a point in time relative to an occurrence of the electronic meeting,
   user-specific identification, identified at the temporal designation, for two or more users associated with the meeting data of electronic meeting;
   one or more topics, identified at the temporal designation, for the electronic meeting, and
   electronic files associated with the meeting data of the electronic meeting;
   curating a stored knowledge graph to identify user context data for the two or more users using the context information collected about the current state of the electronic meeting, wherein the user context data comprises:
   user-specific entity data for each of the two or more users,
   collaborative relationships previously existing between the two or more users,
   file access relationships indicating electronic files access by the two or more users, and
   topics identified from prior communications of the two or more users;
   generating a plurality of data insights from specific portions of the user context data that satisfy a threshold distance evaluation which evaluates a distance between nodes in the stored knowledge graph after curating the stored knowledge graph using the context information;
   executing a relevance scoring on each of the plurality of data insights, wherein the relevance scoring applies one or more trained relevance models to score a relevance of a data insight to the context information collected about the current state of the electronic meeting;

selecting, from the plurality of data insights, a subset of one or more data insights for presentation based on an analysis of an evaluation result that comprises a result of the relevance scoring; and transmitting, to a client device, data for rendering of the subset of one or more data insights.

2. The method of claim 1, wherein the curating of the stored knowledge graph further comprises applying trained artificial intelligence (AI) processing to curate the stored knowledge graph, wherein the trained AI processing is configured to assign a weighting for specific types of the context information, including the user-specific signal data, the one or more topics and the attached electronic files, based on analysis of the temporal designation, and wherein the generating of the plurality of data insights varies the type of data insights generated based on the weighting for the specific types of context information.

3. The method of claim 1, wherein the temporal designation, identified in the context information collected about the current state of the electronic meeting, is used to select the one or more trained relevance models from a plurality of trained relevance models usable for executing the relevance scoring.

4. The method of claim 3, wherein the meeting data is an electronic invite for the electronic meeting and the temporal designation is an identification that the point in time is prior to the start of the electronic meeting, and wherein the generating of the plurality of data insights occurs prior to the start of the electronic meeting.

5. The method of claim 1, wherein the two or more trained relevance models, used in the relevance scoring comprise: a first trained relevance model that generates a first scoring metric for evaluating each of the plurality of data insights based on an evaluation of the distance between nodes in the stored knowledge graph identified in the threshold distance evaluation; and a second trained relevance model that generates a second scoring metric for evaluating each of the plurality of data insights based on an analysis of an amount of prior collaboration between the two or more users, and wherein the selecting of the subset of one or more data insights selects the subset of one or more data insights based on analysis of the first scoring metric and the second scoring metric.

6. The method of claim 5, wherein the two or more trained relevance models, used in the relevance scoring further comprises: a third trained relevance model that generates a third scoring metric for evaluating each of the plurality of data insights based on an a relevance to the one or more topics, identified at the temporal designation, for the electronic meeting, and wherein the selecting of the subset of one or more data insights selects the subset of one or more data insights based on analysis of the first scoring metric, the second scoring metric and the third scoring metric.

7. The method of claim 1, wherein the evaluation result, used to select the subset of one or more data insights, further comprises a determination of a level of urgency for provision of a specific type of data insight where the determination of the level of urgency occurs based on analysis of the temporal designation and user-specific signal data associated with the two or more users, and wherein the subset of one or more data insights are selected based on analysis of the result of the relevance scoring and the determination of the level or urgency.

8. The method of claim 1, further comprising: determining an amount of summary information to display in a rendering of a data insight, of the subset of one or more data insights, based on the analysis of the evaluation result, and wherein the data for rendering the subset of one or more data insights, transmitted to the client device, comprises a determination of the amount of summary information display.

9. The method of claim 1, further comprising: collecting, at a second temporal designation, second context information about an update state of an electronic meeting based on analyzing the meeting data associated with the electronic meeting, wherein the context information collected comprises:

the second temporal designation, user-specific signal data, identified at the second temporal designation, for the two or more users, and one or more topics, identified at the second temporal designation, for the electronic meeting;

executing a second relevance scoring on each of the plurality of data insights, wherein the relevance scoring applies one or more trained relevance models to score a relevance of a data insight to the second context information;

selecting, from the plurality of data insights, a second subset of one or more data insights for presentation based on an analysis of an evaluation result that comprises a result of the second relevance scoring; and transmitting, to the client device, data for rendering of the second subset of one or more data insights.

10. The method of claim 9, further comprising: generating a dynamic timeline of data insights for the electronic meeting that provides an aggregated visualization of the subset of one or more data insights and the second subset of one or more data insights, wherein the dynamic timeline of data insights provides in the aggregated visualization: the first subset of one or more insights identified at the temporal designation and the second subset of one or more data insights identified at the second temporal designation; and transmitting, to the client, the dynamic timeline of data insights for rendering.

11. A system comprising:

at least one processor; and a memory, operatively connected with the at least one processor, storing computer-executable instructions that, when executed by the at least one processor, causes the at least one processor to execute a method that comprises:

collecting context information about a current state of an electronic meeting based on analyzing meeting data associated with the electronic meeting, wherein the context information collected comprises:

a temporal designation indicating a point in time relative to an occurrence of the electronic meeting, user-specific identification, identified at the temporal designation, for two or more users associated with the meeting data of electronic meeting;

one or more topics, identified at the temporal designation, for the electronic meeting, and electronic files associated with the meeting data of the electronic meeting;

curating a stored knowledge graph to identify user context data for the two or more users using the context information collected about the current state of the electronic meeting, wherein the user context data comprises:

user-specific entity data for each of the two or more users, collaborative relationships previously existing between the two or more users, file access relationships indicating electronic files access by the two or more users, and topics identified from prior communications of the two or more users;

generating a plurality of data insights from specific portions of the user context data that satisfy a threshold distance evaluation which evaluates a distance between nodes in the stored knowledge graph after curating the stored knowledge graph using the context information;

executing a relevance scoring on each of the plurality of data insights, wherein the relevance scoring applies one or more trained relevance models to score a relevance of a data insight to the context information collected about the current state of the electronic meeting;

selecting, from the plurality of data insights, a subset of one or more data insights for presentation based on an analysis of an evaluation result that comprises a result of the relevance scoring; and transmitting, to a client device, data for rendering of the subset of one or more data insights.

12. The system of claim 11, wherein the curating of the stored knowledge graph further comprises applying trained artificial intelligence (AI) processing to curate the stored knowledge graph, wherein the trained AI processing is configured to assign a weighting for specific types of the context information, including the user-specific signal data, the one or more topics and the attached electronic files, based on analysis of the temporal designation, and wherein the generating of the plurality of data insights varies the type of data insights generated based on the weighting for the specific types of context information.

13. The system of claim 11, wherein the temporal designation, identified in the context information collected about the current state of the electronic meeting, is used to select the one or more trained relevance models from a plurality of trained relevance models usable for executing the relevance scoring.

14. The system of claim 13, wherein the meeting data is an electronic invite for the electronic meeting and the temporal designation is an identification that the point in time is prior to the start of the electronic meeting, and wherein the generating of the plurality of data insights occurs prior to the start of the electronic meeting.

15. The system of claim 11, wherein the two or more trained relevance models, used in the relevance scoring comprise: a first trained relevance model that generates a first scoring metric for evaluating each of the plurality of data insights based on an evaluation of the distance between nodes in the stored knowledge graph identified in the threshold distance evaluation; and a second trained relevance model that generates a second scoring metric for evaluating each of the plurality of data insights based on an analysis of an amount of prior collaboration between the two or more users, and wherein the selecting of the subset of one or more data insights selects the subset of one or more data insights based on analysis of the first scoring metric and the second scoring metric.

16. The system of claim 15, wherein the two or more trained relevance models, used in the relevance scoring further comprises: a third trained relevance model that generates a third scoring metric for evaluating each of the plurality of data insights based on an a relevance to the one or more topics, identified at the temporal designation, for the electronic meeting, and wherein the selecting of the subset of one or more data insights selects the subset of one or more data insights based on analysis of the first scoring metric, the second scoring metric and the third scoring metric.

17. The system of claim 11, wherein the evaluation result, used to select the subset of one or more data insights, further comprises a determination of a level of urgency for provision of a specific type of data insight where the determination of the level of urgency occurs based on analysis of the temporal designation and user-specific signal data associated with the two or more users, and wherein the subset of one or more data insights are selected based on analysis of the result of the relevance scoring and the determination of the level or urgency.

18. The system of claim 11, wherein the method, executed by the at least one processor, further comprises: determining an amount of summary information to display in a rendering of a data insight, of the subset of one or more data insights, based on the analysis of the evaluation result, and wherein the data for rendering the subset of one or more data insights, transmitted to the client device, comprises a determination of the amount of summary information display.

19. The system of claim 11, wherein the method, executed by the at least one processor, further comprises: collecting, at a second temporal designation, second context information about an update state of an electronic meeting based on analyzing the meeting data associated with the electronic meeting, wherein the context information collected comprises:

the second temporal designation, user-specific signal data, identified at the second temporal designation, for the two or more users, and one or more topics, identified at the second temporal designation, for the electronic meeting;

executing a second relevance scoring on each of the plurality of data insights, wherein the relevance scoring applies one or more trained relevance models to score a relevance of a data insight to the second context information;

selecting, from the plurality of data insights, a second subset of one or more data insights for presentation based on an analysis of an evaluation result that comprises a result of the second relevance scoring; and transmitting, to the client device, data for rendering of the second subset of one or more data insights.

20. The system of claim 19, wherein the method, executed by the at least one processor, further comprises: generating a dynamic timeline of data insights for the electronic meeting that provides an aggregated visualization of the subset of one or more data insights and the second subset of one or more data insights, wherein the dynamic timeline of data insights provides in the aggregated visualization: the first subset of one or more insights identified at the temporal designation and the second subset of one or more data insights identified at the second temporal designation; and transmitting, to the client, the dynamic timeline of data insights for rendering.

* * * * *